United States Patent
Johnson et al.

(10) Patent No.: US 9,864,538 B1
(45) Date of Patent: Jan. 9, 2018

(54) DATA SIZE REDUCTION

(71) Applicant: Amazon Technologies, Inc., Seattle, WA (US)

(72) Inventors: Robert Michael Johnson, Austin, TX (US); Mark Bradley Davis, Austin, TX (US); Norbert Paul Kusters, Redmond, WA (US); Marc Stephen Olson, Bellevue, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 14/750,926

(22) Filed: Jun. 25, 2015

(51) Int. Cl.
*G06F 12/00* (2006.01)
*G06F 3/06* (2006.01)
*G06F 9/50* (2006.01)

(52) U.S. Cl.
CPC .......... *G06F 3/0626* (2013.01); *G06F 3/0665* (2013.01); *G06F 3/0689* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 6,298,370 B1 | 10/2001 | Tang et al. | |
| 6,925,641 B1 | 8/2005 | Elabd et al. | |
| 7,835,380 B1 * | 11/2010 | Aloni | H04L 12/40032 370/394 |
| 7,992,144 B1 | 8/2011 | Hendel et al. | |
| 8,427,347 B1 * | 4/2013 | Chai | H03M 7/30 341/51 |
| 2003/0090702 A1 * | 5/2003 | Trelewicz | H04N 1/4105 358/1.15 |
| 2008/0320476 A1 | 12/2008 | Wingard et al. | |
| 2009/0055826 A1 | 2/2009 | Bernstein et al. | |
| 2009/0150748 A1 | 6/2009 | Egner et al. | |
| 2009/0245097 A1 | 10/2009 | Takakuwa et al. | |
| 2012/0297039 A1 | 11/2012 | Acuna et al. | |
| 2013/0198571 A1 | 8/2013 | Brewerton et al. | |
| 2013/0262958 A1 | 10/2013 | Ruggiero et al. | |
| 2014/0115423 A1 | 4/2014 | Cooke | |

(Continued)

OTHER PUBLICATIONS

Kornaros et al., "Pipelined multi-queue management in a vlsi atm switch chip with credit-based flow-control", *Proceedings of the Seventeenth Conference on Advanced Research in VLSI*, 1997, pp. 127-144.

(Continued)

*Primary Examiner* — Ryan Bertram
*Assistant Examiner* — Jason Blust
(74) *Attorney, Agent, or Firm* — Kilpatrick Townsend & Stockton LLP

(57) ABSTRACT

Server computers often include one or more input/output (I/O) devices for communicating with a network or directly attached storage device. Data transferred between these devices may include blocks of data with a common often repeated and identifiable data pattern. Transfer and storage of data of this nature may be optimized by transferring primarily blocks of data that are not of the pre-determined data pattern. An indicator may be transferred and stored with transferred data that has been reduced in size in this manner.

22 Claims, 18 Drawing Sheets

(56) References Cited

U.S. PATENT DOCUMENTS

2015/0039577 A1    2/2015   Talagala et al.
2015/0178161 A1    6/2015   Burd et al.
2015/0212844 A1    7/2015   Tsirkin et al.
2015/0349805 A1   12/2015   Tsai et al.

OTHER PUBLICATIONS

Ridenour et al., "Low-power buffer management for streaming data", *Circuits and Systems for Video Technology*, IEEE Transactions, 2007, pp. 143-157.

Tzeng et al., "Task management for irregular-parallel workloads on the GPU", *Proceedings of the Conference on High Performance Graphics*, Eurographics Association, 2010, pp. 29-37.

U.S. Appl. No. 14/620,764, filed Feb. 12, 2015, Titled: Servicing I/O Requests in an I/O Adapter Device.

U.S. Appl. No. 14/671,800, filed Mar. 27, 2015, Titled: Payload Checksum Interval.

U.S. Appl. No. 14/672,658, filed Mar. 30, 2015, Titled: Low Latency Write Requests.

U.S. Appl. No. 14/673,474, filed Mar. 30, 2015, Titled: Streaming Interconnect Architecture.

U.S. Appl. No. 15/189,231, filed Jun. 22, 2016, Titled: Servicing I/O Requests in an I/O Adapter Device.

\* cited by examiner

DATA SIZE REDUCTION

BACKGROUND

Server computers often include one or more input/output (I/O) devices. For example, a server computer may include one or more I/O adapter devices for communicating with a network and/or direct-attached storage device. Each I/O device may communicate over multiple, possibly asynchronous interfaces, such as PCI Express (PCIe) and/or Ethernet. For example, a host server computer may send I/O transactions over a PCIe bus to the I/O adapter device, and the I/O adapter device may send those I/O transactions over an Ethernet cable for processing by another server.

Data transferred between server computers and storage devices may frequently include common or often repeated data patterns. For example, some types of data may include large blocks of bits that are all zero. Transfer and storage of data of this nature may be optimized by transferring primarily the blocks of data that do not consist of these identifiable and frequently repeated data patterns. Data cannot simply be deleted, however, because the excluded data, though perhaps common or repeated, may still be relevant. Data that has been reduced in size by excluding blocks that are not the identifiable data pattern may be transferred and stored with an indicator, such as a bitmap, to record which data blocks have been removed. These data blocks, because their content is well understood, can later be reproduced.

BRIEF DESCRIPTION OF THE DRAWINGS

Various embodiments in accordance with the present disclosure will be described with reference to the drawings, in which.

DETAILED DESCRIPTION

Figure 1:
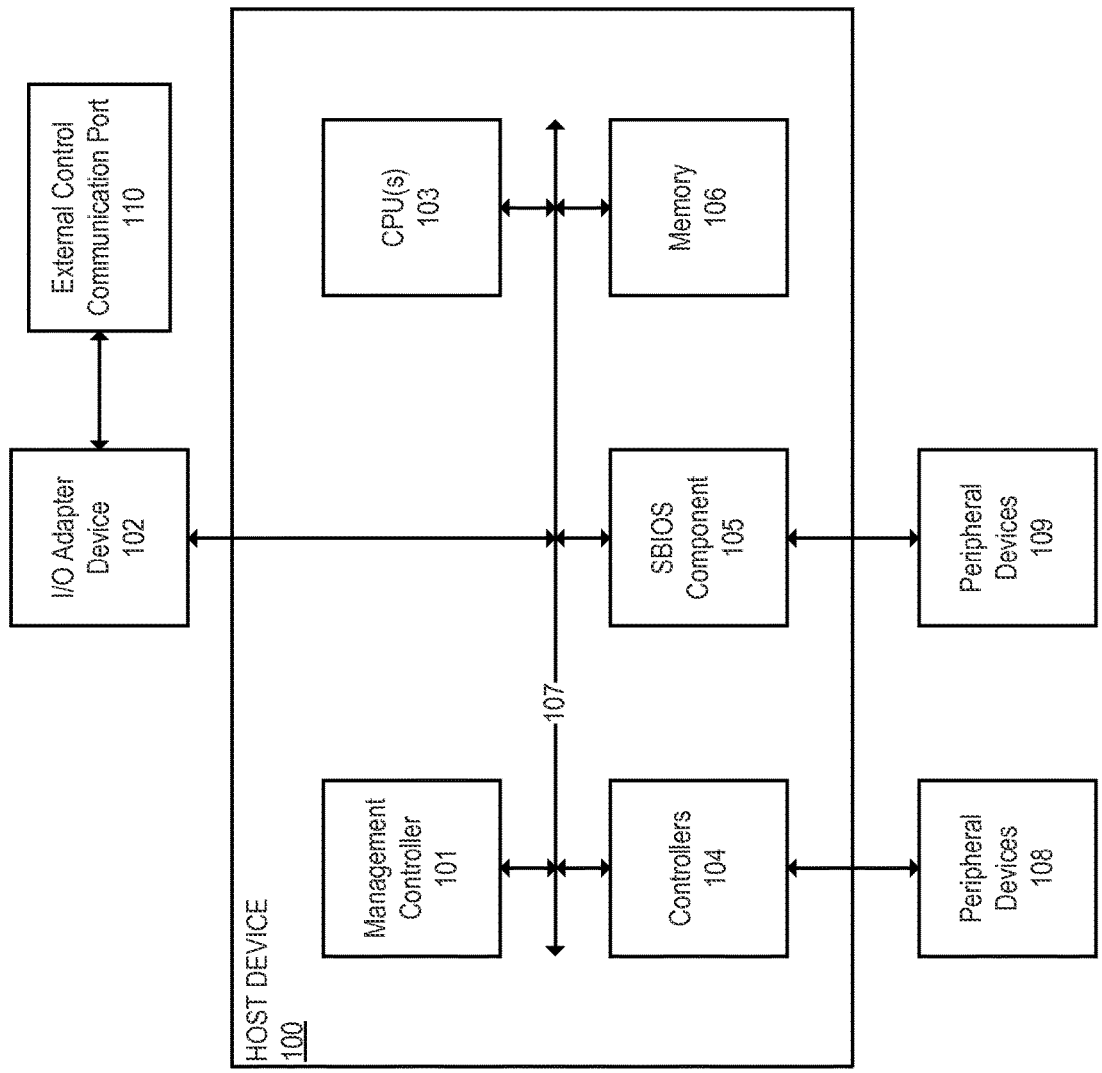
FIG. 1 shows a host device in communication with an I/O adapter device according to one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application-specific integrated circuit (ASIC) or System on Chip (SoC) comprising digital logic operable to send and receive packets.

Techniques are described herein for detecting data patterns in data written and/or read by a computer and reducing the amount of data that is transferred and stored. Data transferred between a computer and a storage location may include blocks of data that follow a data pattern, or reflect a type of data. For example, blocks of data may be all zero, all one, or a repeating pattern, such as alternating zeroes and ones. When data to be written to a storage location includes blocks that follow the data pattern, the transfer size of the data may be reduced by removing the blocks that follow the data pattern, and transferring the remaining data blocks. An indicator, such as a map, may be written with the data to indicate which blocks were removed. When the data is read back to the computer, the indicator may be transferred along with the data. The computer may then use the indicator to reconstruct the blocks that were removed by creating blocks of data according to the data pattern, and inserting them into the data where they were removed. Reducing the size of the transferred data in this way may increase network efficiency, and may be especially advantageous in resource constrained systems.

Reducing the size of the transferred data may also result in reducing the storage space used for storing the transferred data. For example, reducing the size of the transferred data may also be advantageous when systems include storage locations that implement thin provisioning techniques. As applied to data storage systems, thin provisioning provides a method for optimizing available storage. Generally, without thin provisioning, a storage system may allocate large pools of storage space to a server. The server, however, may not use all of the allocated space. With thin provisioning, storage space is allocated as needed or on-demand. On-demand allocation means that a server may only be allocated as much storage space as it needs, thereby improving overall utilization of the storage space.

Thin provisioning may also virtualize the storage space. Virtualization of a physical resource, such as disk storage, gives the appearance of more physical resources than are actually available. Different virtualization schemes exist. One such scheme involves virtualizing blocks of data that match a data type or pattern. For example, when a disk volume is read before it has ever been written to, the storage location may supply data blocks of the given data pattern (for example, all zeroes), rather than reading the disk. Without thin provisioning, the storage location may have allocated this essentially unused disk volume to the server. In contrast, thin provisioning may provide dynamic allocation; that is, allocating disk volumes to servers as-needed. In the foregoing example, where a server has read a disk volume that has never been written to, the storage system need not allocate the volume, because it has not yet actually been used. As another example, when a disk volume that contains some prior data is written to with data of the given data pattern, that disk volume can be re-allocated for other purposes. This is because, when this same data is later read, the storage location can supply the data by providing blocks of data of the given data pattern. The server need not read the disk volume, and so the disk volume can be given over to another entity.

Reducing the size of transferred data may be combined with thin provisioning to potentially increase the efficiency of disk storage. The indicator or map, provided to indicate which blocks of data have been removed to reduce the data size, can inform the storage location of blocks to which the storage location can apply thin provisioning. For example, when data is written by a server, the storage location can allocate and write space for data blocks that were actually transferred, and not allocate and write space for data blocks that were removed because these blocks matched the given data pattern. The un-allocated space can then be used for some other purpose. The storage location may store the information in a map or indicator to remember what the server thinks it has written. Similarly, when the same data is read, the storage location will read the disk for the data that was stored. In some implementations, the storage location may generate the blocks of data that were not stored because they match the given data pattern. In other implementations, the storage location may provide just the map, and leave it to some other entity to generate the removed data blocks. In these implementations, both the data transferred to and from the storage location may be reduced.

An I/O adapter device may implement hardware and/or software to perform writes and reads that include data that has been reduced in size by removing blocks of data of a given data pattern. As noted above, a computer may communicate with an external entity using an I/O device. An I/O adapter device may be configured, for write requests, to detect blocks of data consisting of a given data pattern or type. The I/O adapter device may further be configured to remove these data blocks, and transmit only the data blocks that do not consist of the given data pattern. The I/O adapter device may also be configured, for read requests, to receive read responses containing only data blocks that do not consist of the given data pattern. The I/O adapter device may further be configured to provide data blocks consisting of the given data pattern, as indicated by the indicator sent with the read response.

Providing these services in an I/O adapter device may provide several advantages. For example, the computer and/or processes running on the computer may not themselves need to examine the data to locate blocks that include the given data pattern. The computer and/or server processes may not know or may not need to know what the block size is. Furthermore, by providing the transfer data size reduction in the I/O adapter device, the computer and/or server processes can operate without any knowledge that the transfer data size has been reduced. Advantages may also be provided for storage systems. For example, a storage location may not need to examine incoming data to determine which data blocks include the given data pattern, and thus can be thin provisioned. Similarly, the storage location may not need to supply data that was thin provisioned, and can instead just supply the map that indicates which blocks it will not provide.

An I/O adapter device may be included in a system including a computer and other components. The I/O adapter may further provide physical and virtual services to the computer and/or virtual processes running on the computer. These systems are described in further detail below.

I. Systems

FIG. 1 shows a host device 100 in communication with an I/O adapter device 102 according to one embodiment. However, one skilled in the relevant art will appreciate that the disclosed illustrative components are not meant to be an exhaustive identification of all the components required by or present in a host device 100. Rather, illustrative components have been identified, in a non-limiting manner, to facilitate illustration of one or more aspects of the present application. Still further, the illustrative components of the host device 100 can be considered logical in nature such that the physical implementation of one or more components can be varied or such that one or more of the logical components may be implemented in a virtualized manner. Additionally, one or more host devices 100 can share one or more of the illustrated components, such as processors, graphical processing units, memory and the like.

In an illustrative embodiment, the host device 100 is associated with various hardware components, software components and respective configurations that facilitate the execution of low latency write requests, which will be described in detail below. Specifically, in one embodiment, host device 100 can include a management controller 101 for managing the operation of host device 100 in accordance with the Intelligent Platform Management Interface ("IPMI"). Specifically, the management controller 101 can include an embedded microcontroller that manages the interface between system management software and host device 100 components.

In communication with the host device 100 is an I/O adapter device 102. Generally, the I/O adapter device 102 may include any device that inputs and/or outputs data along a communication channel 107. In one aspect, the I/O adapter device 102 can communicate as a standard bridge component for facilitating access between various physical and emulated components and a communication channel 107. In another aspect, the I/O adapter device 102 can include embedded microprocessors to allow the I/O adapter device to execute computer executable instructions related to the implementation of management functions or the management of one or more such management functions, or to execute other computer executable instructions related to the implementation of the I/O adapter device 102. In some embodiments, the I/O adapter device 102 may be implemented using multiple discrete hardware elements, such as multiple cards or other devices. The management controller 101 can be configured in such a way to be electrically isolated from any other component in the host device 100 other than the I/O adapter device 102. In some embodiments, the I/O adapter device 102 is attached externally to the host device 100. In some embodiments, the I/O adapter device 102 is internally integrated into the host device 100.

Also in communication with the I/O adapter device 102 may be an external communication port component 110 for establishing communication channels between the host device 100 and one or more network based services or other network-attached or direct-attached computing devices. Illustratively, the external communication port component 110 can correspond to a network switch, sometimes known as a Top of Rack ("TOR") switch. The I/O adapter device 102 can utilize the external communication port component 110 to maintain communication channels between one or more services and the host device 100, such as health check services, financial services, and the like.

The I/O adapter device 102 can also be in communication with a System Basic Input/Output System (SBIOS) component 105. The SBIOS component 105 can include non-transitory executable code, often referred to as firmware, which can be executed by one or more processors and used to cause components of the host device 100 to initialize and identify system devices such as the video display card, keyboard and mouse, hard disk drive, optical disc drive and other hardware. The SBIOS component 105 can also include or locate boot loader software that will be utilized to boot the host device 100. For example, in one embodiment, the SBIOS component 105 can include executable code that, when executed by a processor, causes the host device 100 to attempt to locate Preboot Execution Environment (PXE) boot software. Additionally, the SBIOS component 105 can include or takes the benefit of a hardware latch that is electrically controlled by the I/O adapter device 102. The hardware latch can restrict access to one or more aspects of the SBIOS component 105, such as controlling modifications or configurations of the executable code maintained in the SBIOS component 105.

The SBIOS component 105 can be connected to (or in communication with) a number of additional computing device resources components, such as central processing units ("CPUs") 103, memory 106 (e.g., RAM), and the like. In one embodiment, such computing device resource components may be physical computing device resources in communication with other components via the communication channel 107. The communication channel 107 can correspond to one or more communication buses, such as a shared bus (e.g., a front side bus, a memory bus), a point-to-point bus such as a PCI or PCI Express bus, etc., in which the components of the bare metal host device 100 communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device 100. In such embodiments, the I/O adapter device 102 can implement a management process in which a host device is configured with physical or emulated hardware components based on a variety of criteria. The computing device resource components may be in communication with the I/O adapter device 102 via the communication channel 107. In addition, although communication channel 107 in FIG. 1 is shown as connecting all of components 101-106, it should be appreciated that a communication channel in accordance with some embodiments may connect any subset of the components 101-106 and/or other components. For example, a communication channel may connect a PCI Express device to a CPU via a northbridge or host bridge.

Also in communication with the I/O adapter device 102 via the communication channel 107 may be one or more controller components 104 for managing hard drives or other forms of memory. An example of a controller component 104 can be a SATA hard drive controller. Similar to the SBIOS component 105, the controller components 104 can include or take the benefit of a hardware latch that is electrically controlled by the I/O adapter device 102. The hardware latch can restrict access to one or more aspects of the controller component 104. Illustratively, the hardware latches may be controlled together or independently. For example, the I/O adapter device 102 may selectively close a hardware latch for one or more components based on a trust level associated with a particular customer. In another example, the I/O adapter device 102 may selectively close a hardware latch for one or more components based on a trust level associated with an author or distributor of the executable code to be executed by the I/O adapter device 102. In a further example, the I/O adapter device 102 may selectively close a hardware latch for one or more components based on a trust level associated with the component itself.

The host device 100 can also include additional components that are in communication with one or more of the illustrative components associated with the host device 100. Such components can include devices, such as one or more controllers 104 in combination with one or more peripheral devices 108, such as hard disks or other storage devices. Additionally, the additional components of the host device 100 can include another set of peripheral devices 109, such as Graphics Processing Units ("GPUs"). The peripheral devices 108 and 109 can also be associated with hardware latches for restricting access to one or more aspects of the component. As mentioned above, in one embodiment, the hardware latches may be controlled together or independently.

Figure 2:
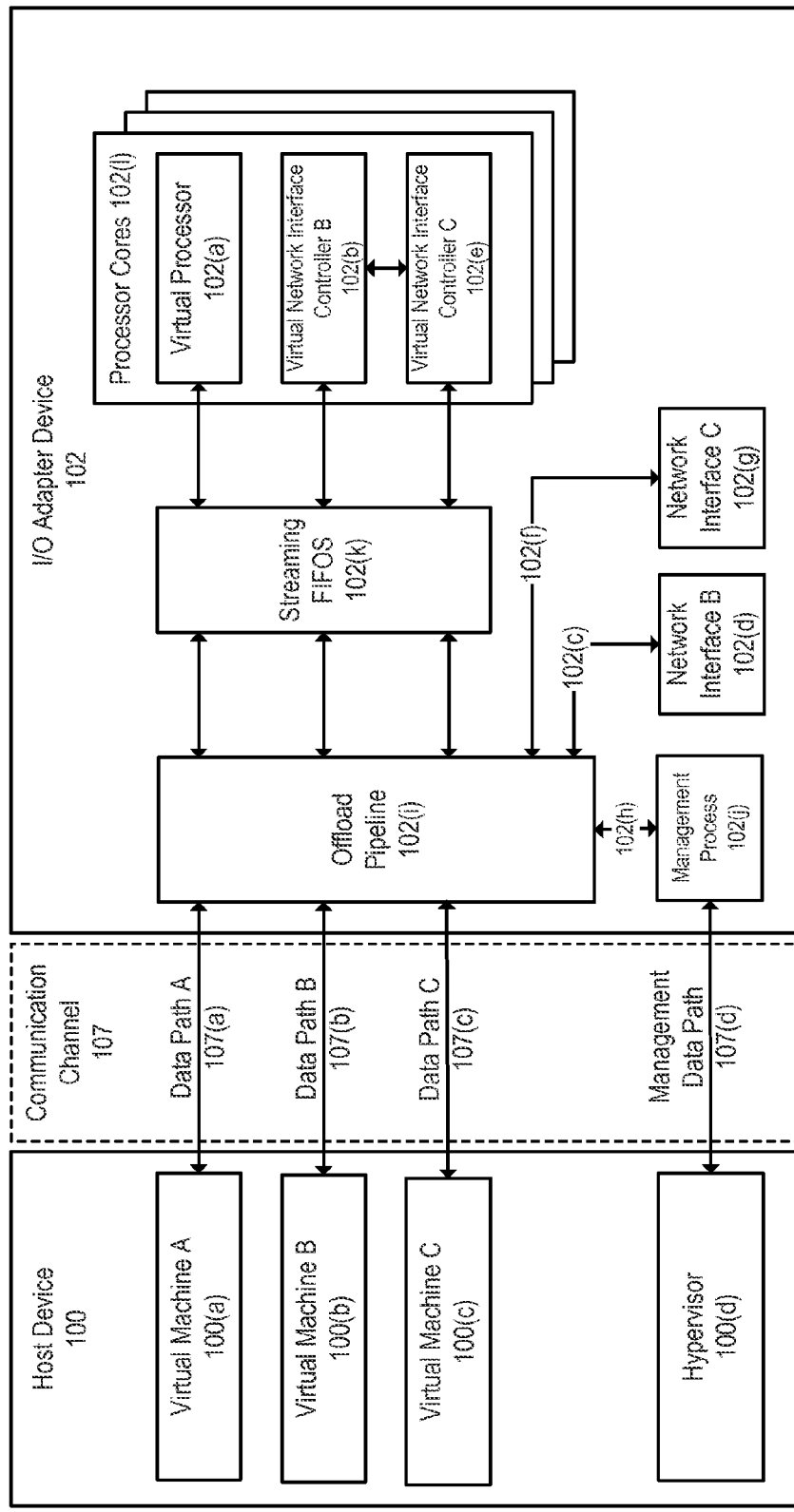
FIG. 2 illustrates one embodiment of communications between the host device and the I/O adapter device.

FIG. 2 illustrates one embodiment of communications between the host device 100 and the I/O adapter device 102. As shown in FIG. 2, the host device 100 may execute a plurality of processes, such as virtual machines A-C 100(a)-(c) and a hypervisor 100(d). The I/O adapter device 102 may include an offload pipeline 102(i) for receiving and handling requests from the virtual machines 100(a)-(c). The I/O adapter device 102 may also include one or more processor cores 102(1). The I/O adapter device 102 may emulate a plurality of devices, such as virtual processor 102(a), and virtual network interface cards 102(b), 102(e), using the processor cores 102(1). The I/O adapter device 102 may also include a management process 102(h). Each of the above-described components of the host device 100 and the I/O adapter device 102 may communicate using data paths 107(a)-(d) over communication channel 107.

Virtual machine A 100(a) may be any suitable emulation of a computer system. Virtual machine A 100(a) may be in communication with a virtual processor 102(a) via a data path A 107(a). The virtual processor 102(a) may include one or more processing elements such as microprocessors. For example, the virtual processor 102(a) may include a general purpose graphical processing unit (GP-GPU), an application-specific instruction-set processor (ASIP), or another specialized processing element that may be better suited for certain tasks (e.g., secure billing and transaction processing) than the host device 100.

Virtual machine B 100(b) may also be any suitable emulation of a computer system. Virtual machine B 100(b) may be in communication with a virtual network interface controller (NIC) B 102(b) via the data path B 107(b). The network interface B 102(d) may be any suitable interface to a computer network. In one example, the network interface B 102(d) may be a physical Ethernet port. In another example, the network interface B 102(d) may be a virtual network interface that shares the same physical Ethernet port with one or more other virtual network interfaces. Virtual machine C 100(c) may similarly be in communication with the network interface C 102(g).

The virtual machines 100(a)-(c) running on the host device 100 may be managed by a hypervisor 100(d). The hypervisor 100(d) may, for example, be configured to create, start, monitor, stop, and delete virtual machines 100(a)-(c). In addition, the hypervisor 100(d) may be configured to communicate with a management process 102(g) on the I/O adapter device 102 via a management data path 107(d). The management process 102(g) may be used to, for example, create or remove virtual devices such as the virtual offload processor 102(a), the virtual NIC B 102(b), and/or the virtual NIC C 102(e) and manage the offload pipeline 102(i) via an offload pipeline interface 102(h).

The virtual machines 100(a)-(c) may be assigned priorities. Priorities mean that the transactions initiated by one virtual machine 100(a) may take precedence over transactions initiated by another virtual machine 100(b). In some embodiments, the priorities may only take effect when the resources of the I/O adapter device 102 are heavily occupied. Priorities may take the form of service level agreements. A service level agreement may, for example, indicate an amount of resource usage permitted to a virtual machine 100(a)-(c). For example, service level agreements may indicate that a virtual machine 100(c) may only be allowed a certain amount of network bandwidth, host memory, and/or I/O adapter device 102 usage. I/O adapter device 102 usage may involve assigning a certain amount of buffer memory space to each virtual machine; thus, for example, service level agreements may indicate how much buffer memory space a virtual machine 100(a)-(c) is assigned.

Priorities may also apply to queues maintained by virtual machines 100(a)-(c). For example, in embodiments where the I/O adapter device 102 implements the Non-Volatile Memory Host Controller Interface Specification (NVMHCI, also called NVM Express or NVMe), a virtual device 102(a) may provide multiple queues, such as for example paired submission and completion queues. Commands are placed by the virtual machine 102(a) into a submission queue. Completions for those commands are placed in the associated completion queue. In some instances, the virtual device 102(a) may provide multiple submission queues. Priorities may be assigned to specific queues, or to specific queue pairs, such that transactions in one queue may take precedence over transactions in another queue. In some embodiments, priorities may not take effect until the I/O adapter device's 102 resources are heavily occupied.

Requests from the virtual machines 100(a)-(c) may be received and handled in the I/O adapter device 102 by an offload pipeline 102(i). The offload pipeline 102(i) may include a pipeline with individual units or streaming components for managing the steps to prepare and issue the requests to the network interfaces 102(d), 102(g). The offload pipeline 102(i) may also include buffer memory for intermediate storage of data associated with requests from the virtual machines 100(a)-(c). The offload pipeline 102(i) may communicate with the processor cores 102(1) and/or virtual devices 102(a), 102(b), 102(e) running on the processor cores 102(1) over one or more streaming FIFOs 102(k). In some instances, the offload pipeline 102(i) provides a fast path for servicing certain requests with lower complexity or certain aspects of the request with respect to the processor cores 102(1) executing on the I/O adapter device.

It should be noted that although certain virtual devices are shown as part of the I/O adapter device 102 of FIG. 2 (i.e., virtual processor 102(a) and virtual network interface cards B 102(d) and C 102(g)), embodiments may generally relate to any suitable virtual or physical I/O device. In addition, although in FIG. 2 virtual machines 100(a)-(c) and virtual devices 102(a), 102(b) and 102(e) have a one-to-one correspondence, in various embodiments a virtual machine may be associated with zero, one, or multiple virtual devices on an I/O adapter device. Furthermore, although FIG. 2 is described with reference to a plurality of virtual machines running on host device 100, it should be noted that in some embodiments host device 100 may run a single, non-virtualized operating system.

Systems including computers and I/O adapter devices may provide hardware and or software to reduce the size of data written and read by the computers through the I/O adapter device. These systems, however, are provided only as an example of systems that may implement this transfer data size reduction. The transfer data size reduction discussed below may be implemented by other systems that include other components. Before discussing how an I/O adapter device may implement transfer data size reduction, first discussed are methods for reducing the transfer data size, including one implementation referred to as zero block bitmap.

II. Zero Block Bitmap

FIGS. 3A-3D illustrate an example implementation for reducing the data transfer size. More specifically, FIGS. 3A-3D illustrate an example implementation for a zero block bitmap.

Figure 3A:
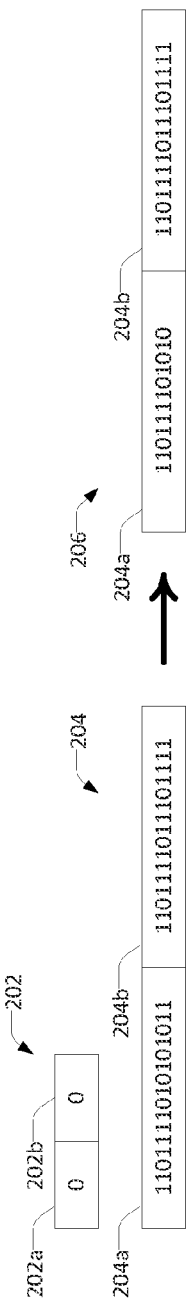
FIGS. 3A-3D illustrate an example implementation for reducing the data transfer size; more specifically, these figures illustrate an example implementation for a zero block bitmap.

FIG. 3A illustrates a first example. Illustrated is data 204 that is to be transferred, either by a write request or a read request. The data 204 represents the data as it would be seen by a host device and/or a process running on the host device. That is, for a write request, the data 204 represents the data that the host device is requesting to write. For a read request, the data 204 represents the data that the host device expects to receive for its read request. The data 204 can be of any size.

The data 204 may be viewed as consisting of an arbitrary number of data blocks 204a, 204b. The size of the data blocks 204a, 204b may be configured by software or hardware, and/or each request may be individually configured with a different data block size. Alternatively or additionally, the size of the data blocks 204a, 204b may be determined by a system configuration, such as for instance the transfer size allowed by the protocol used to transfer the data and/or a block size used by the storage location to store blocks of data. For example, storage locations, such as disk drives, may store data in blocks of 4 KB. For purposes of the example illustrated by FIG. 3A, the data 204 is being viewed as consisting of two data blocks 204a, 204b.

FIG. 3A also illustrates transfer data 206. The transfer data 206 represents the data to be transferred after the data 204 has been reduced according to implementations for reducing the data transfer size. The transfer data 206 is the data that is actually transferred. The transfer data 206 may also be referred to herein as the payload data, where the payload is part of a packet that is transferred between devices. The transfer data 206 is discussed in further detail below.

Also illustrated in FIG. 3A is an example of an indicator, here given by way of example as a bitmap 202. The bitmap 202 may be used to indicate which data blocks 204a, 204b are of data of a pre-determined data type or pattern. In the example of FIG. 3A, because the data 204 is being viewed as consisting of two data blocks 204a, 204b, the bitmap 202 correspondingly consists of two bits 202a, 202b, with each bit 202a, 202b mapping to a data block 204a, 204b of the data 204. Here the leftmost bit 202a is shown as mapping to the leftmost data block 204a of the data 204. It is understood that the leftmost bit 202a may instead map to the rightmost data block 204b, if it is more suitable for a given implementation.

The pre-determined data type or pattern may include data consisting of certain bit patterns. For example, bit pattern may be all zeroes (e.g., "00000000 . . . ") or all ones (e.g., "11111111 . . . "). Such bit patterns may be described as a data pattern of "all zeroes" or "all ones." Another example of a bit pattern may be a repeating pattern. For example, a data pattern described as a "running" or "repeating" pattern may consist of a pattern of alternating ones and zeroes (e.g., "01010101" or "00110011"). A repeating pattern may consist of any number of repeating bits, such as for instance a repeating word, where a word may be defined as consisting of sixteen, thirty-two, sixty-four, or some other number of bits. Another example of a bit pattern may be a known, or common, or often reused, or otherwise clearly identifiable piece of data. For example, one data pattern may be described as a common symbol, such as for example "frame start," that may often be repeated in a stream of data. The data pattern may be configured among senders and recipients in advance, for example during a system configuration routine. Alternatively or additionally, the data pattern may be sent with each individual transfer, for example in a literal form (e.g., a data block or partial data block of the data pattern is sent) or in an encoded form (e.g., an encoding indicates "all zero" or "all one" or "frame start pattern," etc.).

In the example of FIG. 3A, the data pattern has been determined to be a pattern of all zeroes. This means that, when examining the data 204, an implementation for reducing the data transfer size may determine, for each data block 204a, 204b, whether the data block 204a, 204b consists of all zeroes. When any of the data blocks 204a, 204b are all zero, this may be indicated in the bitmap 202. For this example, the bitmap 202 may thus be referred to as a zero block bitmap.

In the example FIG. 3A, neither of the data blocks 204a, 204b consists of all zeroes. The bitmap 202 reflects this by indicating "0" or "false" for each of the two data blocks 204a, 204b. This is also reflected in the transfer data 206. As noted above, the transfer data 206 represents the actual data to be transferred. The transfer data 206 may include data blocks 204a, 204b from the data 204 that are not of the data pattern or type. By including primarily data blocks that are not of the data type, the transfer data 206 may possibly be a reduced in size from the original data 204. In this example, neither of the data blocks 204a, 204b are of the data type of all zero, so the transfer data 206 includes all of the data blocks 204a, 204b.

It is understood that the use of "0" to indicate that a data block 204a, 204b does not consist of the pre-determined data pattern is arbitrary, and that "1" or some other bit value may be used instead.

Figure 3B:
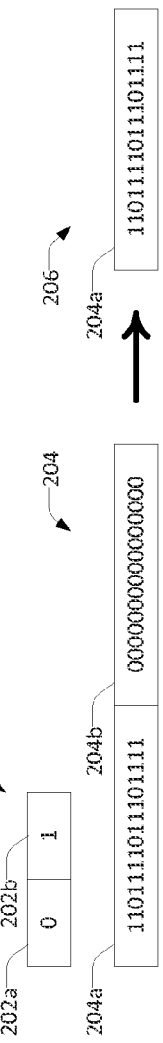

FIG. 3B illustrates a variation of the example illustrated in FIG. 3A. In FIG. 3B, the data 204 to be transferred is also being viewed as consisting of two data blocks 204a, 204b. In this example, the first data block 204a consists of some information. The second data block 204b consists of all zeroes. Thus, when examining the data 204, it may be determined that the second data block 204b is of the data pattern or type, that is, the data pattern of a pattern of all zeroes. This is reflected in the bitmap 202, where the bit 202b that maps to the second data block 204b indicates "1" or "true." In the meantime, the first data block 204a may be determined as not consisting of the data pattern, and so the bit 202a that maps to the first data block 204a indicates "0" or "false."

Because one of the data blocks 204a, 204b is of the data pattern or type, the data actually transferred (that is, the transfer data 306) may be reduced in size. The transfer data 206 includes the data blocks 204a that are not of the data type. In this example, only the first data block 204a is included in the transfer data 206. The bitmap 202 or some equivalent is sent with the transfer data 206 to the recipient, to indicate to the recipient that the second data block 204b was not included in the transfer data 206. The recipient of the transfer data 206 may reproduce the second data block 204b, as needed.

Figure 3C:
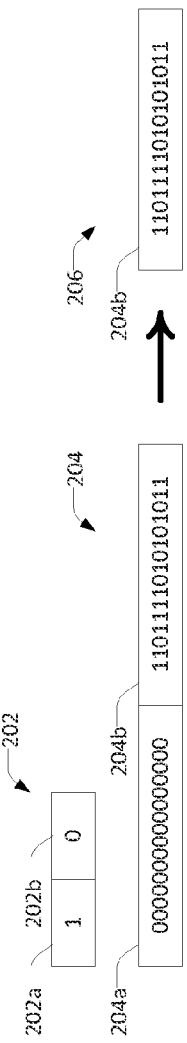

FIG. 3C illustrates another variation of the examples illustrated in FIGS. 3A and 3B. In FIG. 3C, the data 204 to be transferred is also being viewed as consisting of two data blocks 204a, 204b. In this example, the first data block 204a consists of all zeroes, while the second data block 204b consists of some information. Because the first data block 204a is of the data type, the bit 202a that maps to the first data block 204a indicates "1" or "true." Because the second data block 204b is not of the data type, the bit 202b that maps to the second data block 204b indicates "0" or "false."

As in the example of FIG. 3B, the transfer data 206 in the example of FIG. 3C may also be reduced in size from the original data 204. In this example, the transfer data 206 does not include the first data block 204a, because it is of the data pattern or type, and does include the second data block 204b, because it is not of the data type. Even though the transfer data 206 includes only the second data block 204b, the transfer data 206 does not need to include any sort of placeholder for the first data block (for example, padding and/or a token number of bits). This is because the recipient of transfer data 206 will also receive the bitmap 202. The bitmap indicates to the recipient that the first data block 204a was not included with the transfer data 206. The recipient may, if needed, reproduce the first data block 204a and append the transfer data 206, to reproduce the original data 204.

Figure 3D:
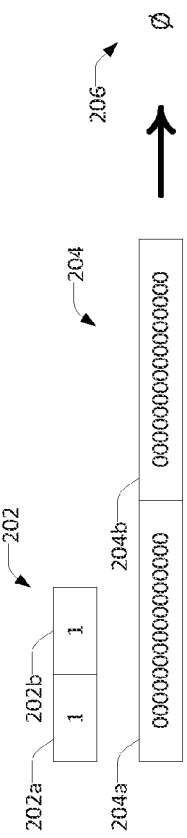

FIG. 3D illustrates another variation of the above examples. In FIG. 3D, the data 204 to be transferred is also being viewed as consisting of the data block 204a, 204b. In this example, both data blocks 204a, 204b consist of all zero. Because both data blocks 204a, 204b are of the data type, both bits 202a, 202b in the bitmap 202 are set to "1" or "true." Here also the transfer data 206 does not need to include either of the data blocks 204a, 204b, since both are of the data type. The transfer data 206 may therefore be empty, or consist of null data blocks, where a null data block is an empty data block. The recipient of the transfer data 206 is made aware that the empty transfer data 206 does, in fact, represent data, by the bitmap 202, which is sent regardless of whether the transfer data 206 is empty. The recipient of the transfer data 206 may reproduce the data blocks 204a, 204b, if needed, or may store the bitmap 202, or some variation of the bitmap 202, if the data 204 is not immediately needed.

FIGS. 3A-3D illustrate that the data 204 to be transferred may, when actually transferred, be somewhat to significantly reduced in size. In the given examples, the data 204 was reduced to half the size, and even to zero. Reducing the size of the data transferred may conserve resources for other uses. Implementations may further optimize the data reduction. For example, it may be that, in one data block, all the bits except one are zero. If this is the case, then the data block is not of the data type "all zero" and thus cannot be reduced from the transfer data. Additional advantage may thus be gained by providing a variable data block size.

FIGS. 4A-4D illustrate an example implementation with an optionally configurable data block size. In this example, the data 304 may be reduced in size based on a configurable data block size, where the data block size may be configured for all data transfers, for particular groups of data transfers, and/or for each data transfer.

Figure 4A:
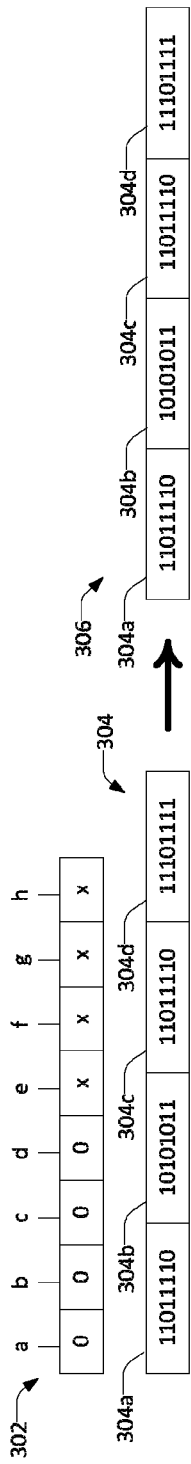
FIGS. 4A-4D illustrate an example implementation for reducing the data transfer size with an optionally configurable data block size.

FIG. 4A illustrates a first example for reducing the transfer data size with a configurable data block size. Illustrated is data 304 that is to be transferred, either by a write request or a read request. The data 304 represents the data as it would be seen by a host device and/or a process running on the host device. That is, for a write request, the data 304 represents the data that the host device is requesting to write. For a read request, the data 304 represents the data that the host device expects to receive. The data 304 can be of any size.

In the illustrated example, the data 304 is viewed as consisting of four data blocks 304a-d of equal size. The data 304, however, can be viewed as consisting of any number of data blocks, limited only by the bitmap 302, as explained below. The size of the data blocks can be configured for each individual write or read request, and/or for a group of requests (e.g., all requests for a certain priority, or from a specific virtual machine, or directed to a specific queue), and/or for all requests. The size of the data blocks can be determined by senders and recipients of the transferred data in advance, for instance, during a system configuration routine. Alternatively or additionally, the size of the data blocks may be sent between senders and recipients when needed to update the system, and/or periodically. Alternatively or additionally, the size of the data blocks may be sent, for each individual write or read request, with the transferred data.

Similarly, in some implementations the size of the bitmap and/or the number of bits in use in the bitmap may be established between senders and recipients of the transferred data. These bitmap-related parameters may be determined and configured in advance among senders and recipients. Alternatively or additionally, the bitmap-related parameters can be sent between senders and recipients when needed to update the system, and/or periodically. Alternatively or additionally, bitmap-related parameter may be sent with the transferred data.

FIG. 4A also illustrates transfer data 306. The transfer data 306 represents the actual data transferred between senders and recipients. The transfer data 306 may also be referred to herein as the payload data of packet. The transfer data 306 is discussed in further detail below.

Also illustrated in FIG. 4A is an indicator, here given by way of example as a bitmap 302. The bitmap 302 may be used to indicate which of the data blocks 304a-d are of a pre-determined data type or pattern. In the illustrated example, the bitmap 302 consists of eight bits 302a-h. The bitmap 302, however, may consist of any number of bits, as is convenient for a given implementation. Each bit 302a-h in the bitmap 302 maps to a data block in the data 304. In this example, by providing a bitmap 302 of eight bits 302a-h, the data 304 may be viewed as having as many as eight data blocks. It is understood that, should it be desired to view the data 304 as having more than eight data blocks, the bitmap 302 would have to provide more bits. For example, if the data 304 is be viewed as having sixteen data blocks, the bitmap 302 needs to provide at least sixteen bits.

The data 304, however, may be viewed as having fewer data blocks than can be mapped by the bitmap 302. As given in the present example, the data 304 is viewed as having four data blocks 304a-d. Thus only four bits 302a-d from the bitmap 302 may be used, while the remaining four bits 302e-h remain unused. A bitmap 302 that provides more bits 302a-h than are necessary for a given data transfer provides flexibility. For example, another data transfer may choose to view the data 304 as having eight data blocks, and thus use all eight bits in the bitmap 302. Another data transfer may choose the data 304 as having only two data blocks, and thus need only two bits in the bitmap 302. Yet another transaction may choose the data as having only one data block, and thus need only one bit in the bitmap 302, while another may choose to view the data as having five data blocks, and so on. The bits in the bitmap 302 can be mapped to data blocks in any convenient matter. In the illustrated example, the leftmost bit 302a maps to the leftmost data block 304a, the second to leftmost bit 302b maps to the second to leftmost data block 304b, etc.

Each bit 302a-d in the bitmap 302 indicates whether the corresponding data block 304a-d is of a pre-determined data pattern or type. The pre-determined data type may include data consisting of certain bit patterns. In the illustrated example, the data type is the bit pattern "11001010". This bit pattern may represent an often repeated key, or sequence, or framing indicator, or something of a similar nature that is consistent and identifiable.

In this current example, none of the data blocks 304a-d are of the data type consisting of the bit pattern "11001010." The bitmap 302 reflects this by indicating "0" or "false" in the four bits 302a-d that map to the four data blocks 304a-d. This is also reflected in the transfer data 306. As noted above, the transfer data 306 represents the actual data to be transferred. The transfer data 306 may include data blocks 304a-d that are not of the data type. By including primarily data blocks that are not of the data type, the transfer data 306 may possibly be reduced in size from the original data 304. In this example, none of the data blocks 304a-d are of the data type consisting of the bit pattern "11001010," so the transfer data 306 includes all of the data blocks 304a-d.

Figure 4B:
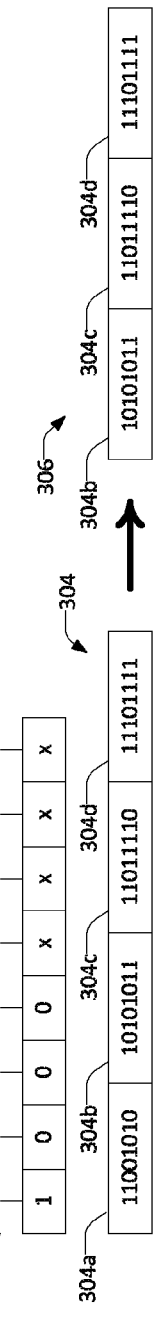

FIG. 4B illustrates a variation of the example illustrated in FIG. 4A. In FIG. 4B, the data 304 to be transferred is also being viewed as consisting of four data blocks 304a-d. In this example, the first data block 304a is of the data type consisting of the bit pattern "11001010". This is reflected in the bitmap 302, where the bit 302a that maps to the first data block 304a indicates "1" or "true." The remaining three data blocks 304b-d contain some other information, and are not of the data type. This is reflected in the bitmap 302, where the bits 302b-d that map to these three data blocks 304b-d indicate "0" or "false."

Because a data block 304a is of the data type, the data actually transferred (that is, the transfer data 306) may be reduced in size. The transfer data 306 includes the data blocks 304b-d that are not of the data type. In this example, the transfer data 306 includes the second 304b, third 304c, and fourth 304d data blocks, and does not include the first data block 304a. The bitmap 302 or some equivalent is sent with the transfer data 306 to the recipient, to indicate to the recipient which of the data blocks 304a-d were not included in the transfer data 306. The recipient is aware that only data blocks with the bit pattern "11001010" were not transferred. The recipient may, if needed, reproduce the first data block 304a, and place it before the data blocks 304b-d from the transfer data 306, as in the original data 304.

Figure 4C:
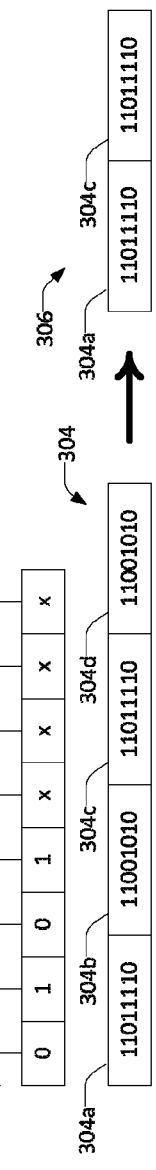

FIG. 4C illustrates another variation of the examples illustrated in FIGS. 4A and 4B. In FIG. 4C, the data 304 to be transferred is also being viewed as consisting of four data blocks 304a-d. In this example, the second 304b and fourth 304d data blocks are of the data type consisting of the bit pattern "11001010." This is reflected in the bitmap 302, where the bit 302b that maps to the second data block 304b and the bit 302d that maps to the fourth data block 304d are both set to "1" or "true." The first 304a and third 304c data blocks include some other information. This is also reflected in the bitmap 302, where the bit 302a that maps to the first data block 304a and the bit 302c that maps to the third data block 304c are both set to "0" or "false."

As in the example of FIG. 4B, the transfer data 306 in the example of FIG. 4C may also be reduced in size from the original data 304. In this example, the transfer data 306 includes the first 304a and third 304c data blocks. The transfer data 306 does not include the second 304b and fourth 304d data blocks, because these two data blocks 304b, 304d are of the data type. The transfer data 306 is thus reduced to half the size of the original data 304. The bitmap 302 or some equivalent is sent with the transfer data 306 to the recipient. The recipient 306 is thus informed that the second 304b and fourth 304d data blocks were not included in the transfer data 306. The recipient may, if needed, reproduce the second 304b and fourth 304d data blocks, and insert them between the data blocks 304a, 304c from the transfer data 306, to reproduce the original data 304. Alternatively, the recipient may store the bitmap 302 or some equivalent with the transfer data 306, to remember that the stored transfer data 306 represents a reduced version of the original data 304.

Figure 4D:
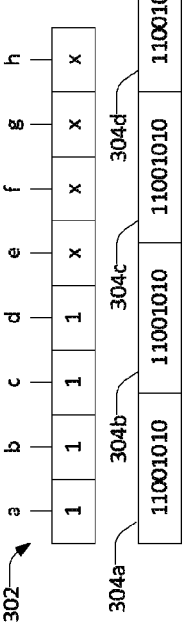

FIG. 4D illustrates another variation of the above examples. In FIG. 4D, the data 304 to be transferred is also being viewed as consisting of four data blocks 304a-d. In this example, all four data blocks are of the data type consisting of the bit pattern "11001010." This is reflected in the bitmap 302, where the four bits 302a-d that map to the four data blocks 304a-d are each set to "1" or "true." This is also reflected in the transfer data 306, which includes none of the data blocks 304a-d. The transfer data 306 may therefore be empty, or consist of null data blocks, where a null data block is an empty data block. A transfer, however, without data is nevertheless made to the intended recipient of the transfer data 306. This transfer may include the bitmap 302 or some equivalent. The bitmap 302 informs the recipient that the data-less transfer did represent a transfer of data. The recipient may use bitmap 302 to reproduce the data 304, if needed. The recipient is aware of the data type of the blocks that were not transferred, and so for every bit 302a-d that indicates "true" for a data block, the recipient need only create a block with the bit pattern "11001010." Alternatively, the recipient may store the bitmap 302 or some equivalent. This may be the case when, for example, the recipient is a storage location, and the storage location is configured to store the reduced-size transfer data 306.

FIGS. 4A-4D illustrate that the data 304 to be transferred may be viewed in data blocks of varying sizes, and that any of these data blocks may be excluded from the data that is actually transferred 306. The transfer data 306 may thus be somewhat to significantly reduced in size. Implementations that include configurable data block sizes may provide greater flexibility in reducing the transfer data size 306. The data block size may be tailored for the data that is typically transferred within a given system. Similarly, the data pattern used to reduce the transfer data size may also be tailored for the data that may be transferred by the system. These options provide the ability to fine tune the data reduction to provide greater efficiency in both the transfer and storage of data.

The above examples illustrate in general terms how the transfer data size may be reduced. The following sections describe data transfer size reduction as may be implemented by embodiments of an I/O adapter device. An I/O adapter device is described to provide context, and it is understood that the devices that may implement data transfer size reduction are not limited to the disclosed embodiments.

III. Write Requests

Figure 5:
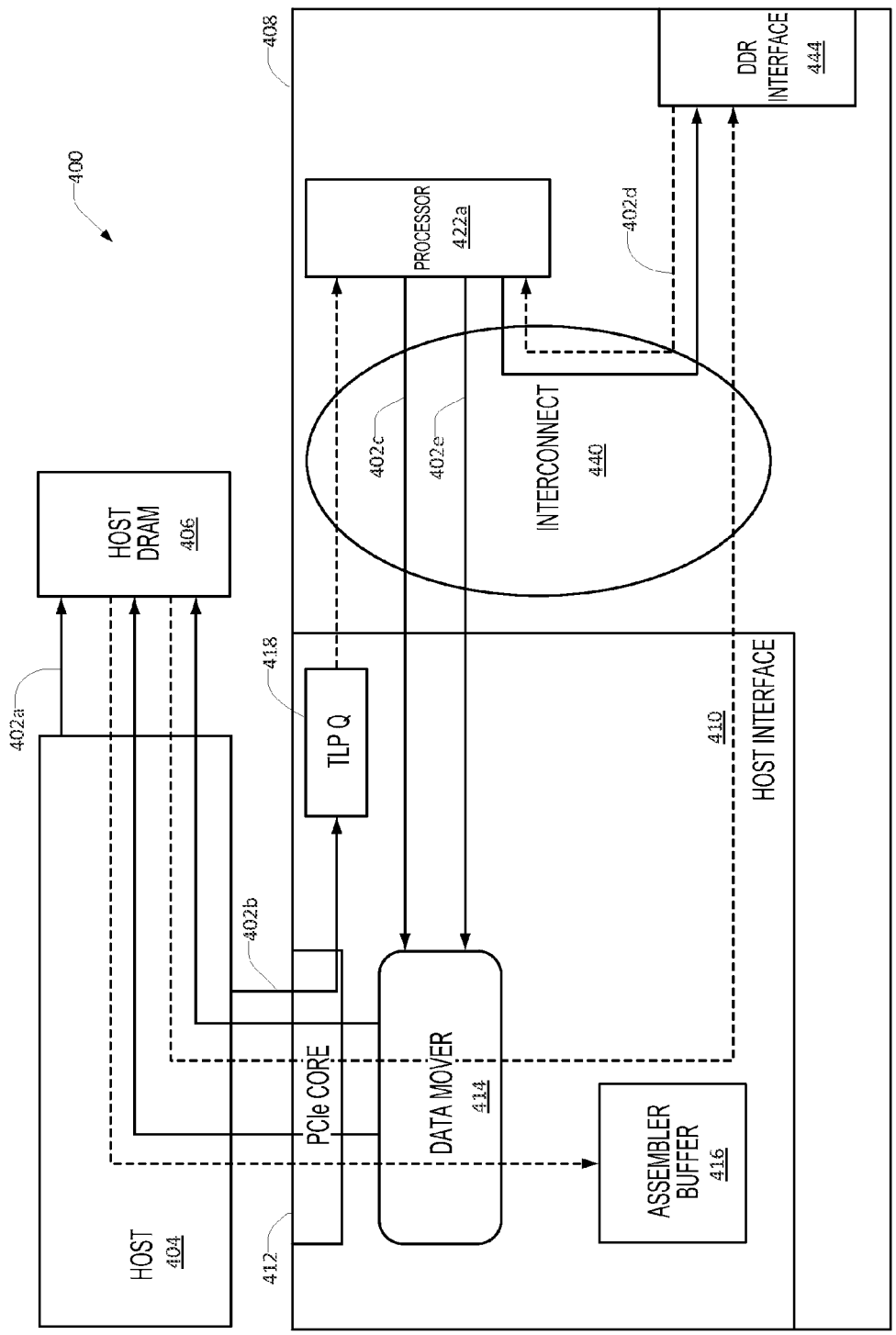
FIG. 5 illustrates one embodiment of a system for implementing a storage write request, where the write request may be targeted to a storage location.
Figure 6:
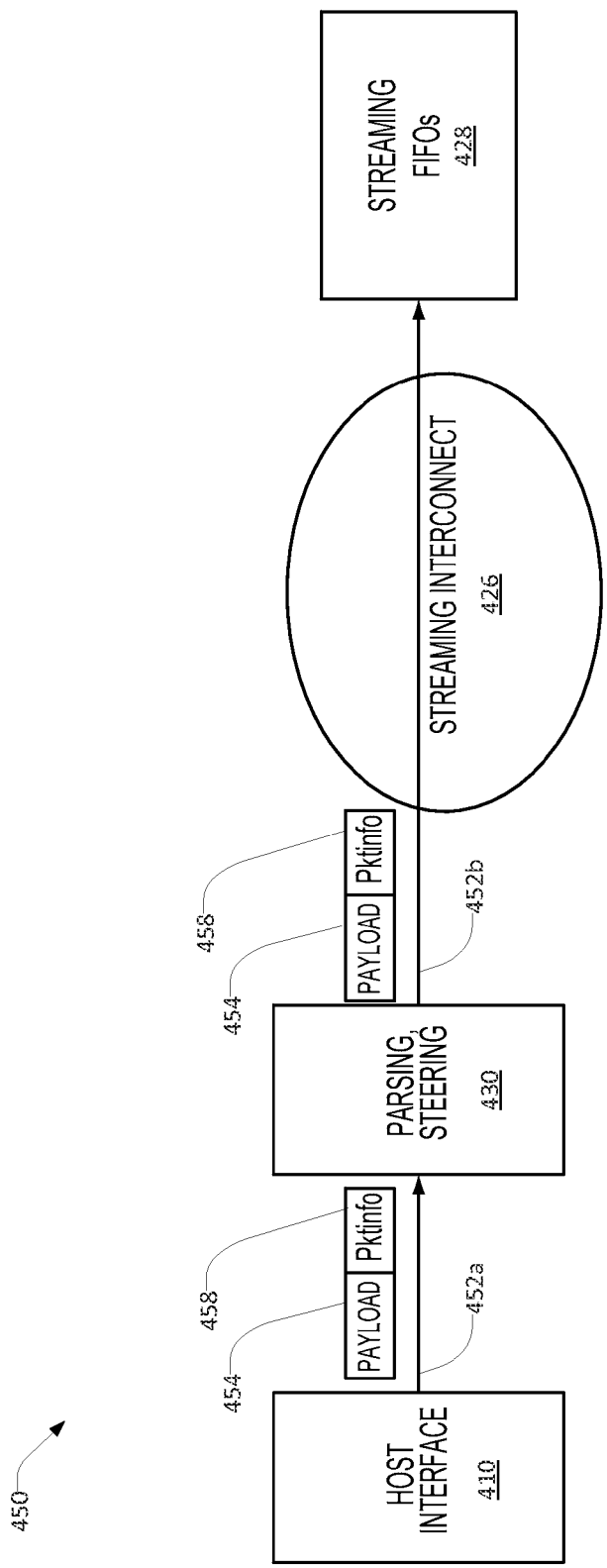
FIG. 6 illustrates one embodiment of a packet flow for moving a write packet for a write request described above through the preliminary stages of an offload pipeline.
Figure 7:
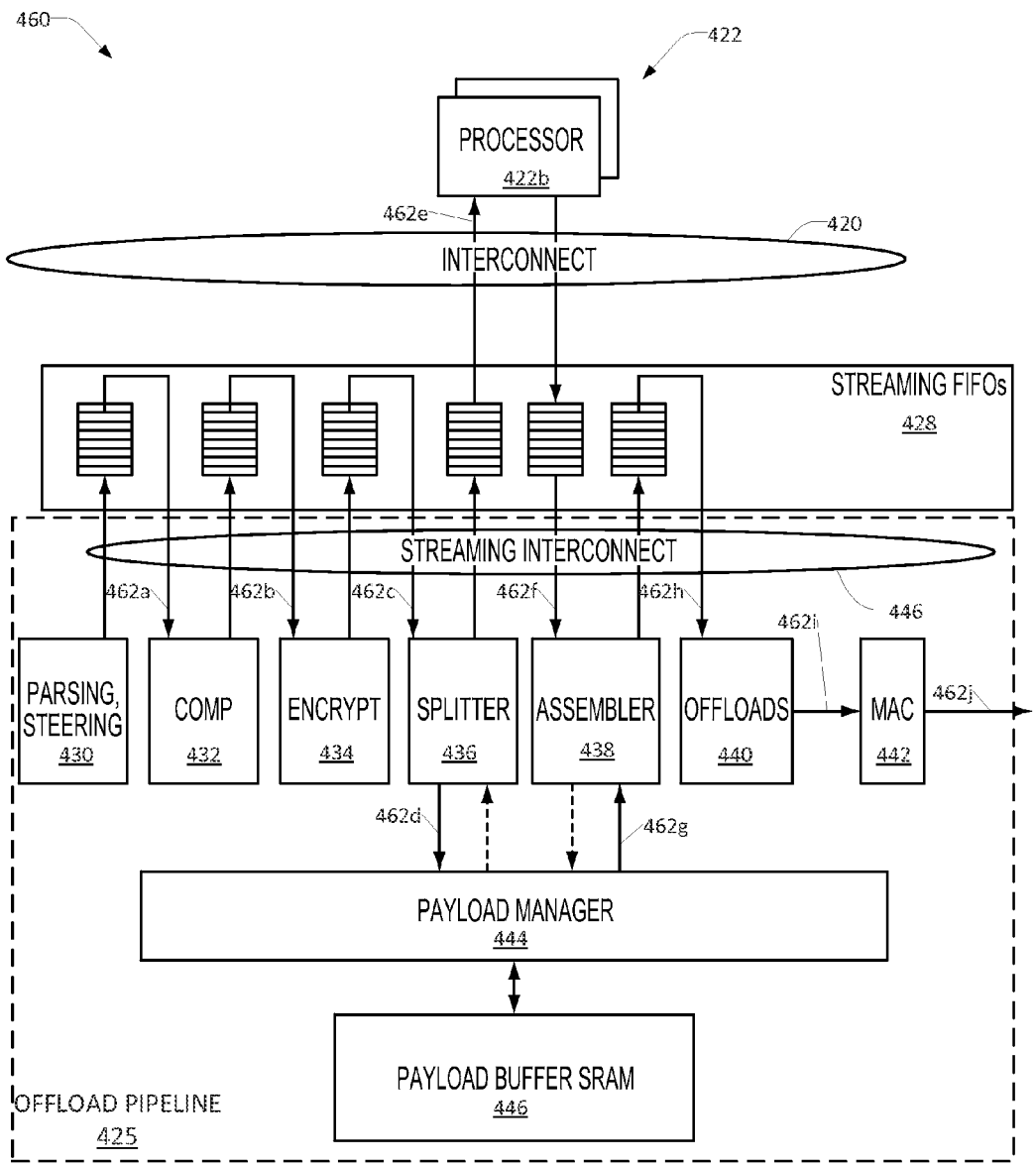
FIG. 7 illustrates one embodiment of a flow of the write packet through the offload pipeline of the I/O adapter device.

FIGS. 5-8 illustrate one embodiment of an I/O adapter device configured to process a write request. FIGS. 5-8 illustrate general and flexible write request processes, configured for most variants of write requests, special write cases, and management of errors. These figures illustrate how a write request is transferred from a virtual machine on a host device to an I/O adapter device (FIG. 5). The write request is transferred from a host interface in the I/O adapter device to an offload pipeline in the I/O adapter (FIG. 6). The write request flows through the offload pipeline, where it is processed and transmitted to a storage location (FIG. 7). A write request may receive one or more responses from the storage location. These responses also flow through, and are processed by, the offload pipeline (FIG. 8), and once all responses are received, the I/O adapter device informs the virtual machine that the write request has completed.

FIG. 5 illustrates one embodiment of a system 400 for implementing a storage write request, where the write request may be targeted to a storage location. The storage location may comprise, for example, a remote computing device, a network-attached storage device, and/or a direct-attached storage device. Remote computing devices include devices, such as for example a server computer, that an I/O adapter 408 device can communicate with over a network or series of networks. Network-attached storage devices include devices configured to store data, which the I/O adapter device 408 can communicate with over a network or series of networks. Direct-attached storage devices include storage devices directly attached to the host device 404.

Also illustrated in FIG. 5 are the initial steps to execute a write request. The write request is transferred from a virtual machine on a host device 404 to an I/O adapter device 408. In some instances, the write request originates from a virtual machine executing on the host device 404. The I/O adapter device processes the write request through an offload pipeline 425, discussed in further detail below, and transmits the write request to the targeted storage location, for example through a network interface port. The network interface port can be, for example, a 10 Gb, 25 Gb, or 50 Gb port or any other high data bandwidth interface port.

FIG. 5 illustrates one embodiment of the steps by which a write request may be transferred from a virtual machine on a host device 404 to an I/O adapter device 408. In some embodiments, the communication channel between the host 404 and the I/O adapter device 408 takes the form of a PCIe interface. In such embodiments, the host interface 410 may include a PCIe core 412. It is understood that a PCIe interface is only given as an example, and that, as explained above, the communication channel can be implemented in other forms.

As a first step, the virtual machine on the host 404 posts 402a the write request by, for example, writing the data that is to be transmitted to a buffer in host DRAM 406. The virtual machine may also write other information about the write request to host DRAM 406, such as a packet descriptor, which indicates where in the host DRAM 406 the data to be written by the write request is located.

As a second step, the virtual machine on the host 404 may notify 402b the I/O adapter device 408 that it has posted 402a the write request. In some embodiments, the I/O adapter device 408 communicates with the host 404 over a PCIe communication channel. In such embodiments, the host interface 410 may include a PCIe core 412. Also in such embodiments, the notification 402b may take the form of a doorbell write. The doorbell write is steered to a Transaction Layer Packet (TLP) queue 418 that is associated with a processor 422a. The processor 422a is one of one or more processors included in some embodiments of the I/O adapter device 408. Any of the one or more processors may be designated for specific tasks, such as handling requests or specific types of requests from a specific virtual machine. For example, the processor 422a in this example may have been designated to handle the I/O requests from a specific virtual device. Individual processors may be implemented as ARM cores. The processors communicate with the host interface 410 through an interconnect 420. In some embodiments, such as embodiments in which the processors are implemented as ARM cores, the interconnect 420 can be an AXI interconnect.

As a third step, information about the write request is transferred from the host 404 to the I/O adapter device 408. The processor 422a instructs 402c a data mover 414 to fetch information for the write request from the host DRAM 406. For example, the data mover 414 may fetch the packet descriptor, which indicates where in the host DRAM 406 the write data is located. The packet descriptor, and/or other information about the write request, may be stored in a DDR through a DDR interface 424 on the I/O adapter device 408. In some embodiments, the processor 422a may have prefetched the packet descriptors, and thus may not need to fetch the packet descriptors at this stage.

At a fourth step, the designated processor 422a may read 402d descriptor information from a DDR through a DDR interface 424 on the I/O adapter device 408. The descriptors stored in the DDR include information about the write request. For example, the descriptors may include the request type, the size of the data to be transferred by the request, where in the host DRAM 406 the data is located, and/or where in the I/O adapter's payload buffer the data may be temporarily stored. Descriptors may be placed in the DDR when the write request is initially transferred to the I/O adapter device. The I/O adapter device 408 may add the descriptor to a list of descriptors. The I/O adapter device 408 may maintain a list or queue of descriptors, where the list or queue is used to track requests that are being processed or will be processed in the future. For example, the write request may be added to a submission queue. Descriptors are extracted from the submission queue when the associated write request is processed. The descriptor information may indicate that more descriptors should be fetched from the host DRAM 406.

As a fifth step, the processor 422a may initiate a request to fetch write data from the host 404. The designated processor 422a may instruct 402e the data mover 414 to fetch the write data from the host DRAM 406. To fetch the write data, the host interface 410 may execute a memory access request to transfer the write data. A memory access request may take the form, for example, of a direct memory access (DMA) transaction. This DMA transaction may only transfer a portion of the write data. In some embodiments, the write data is transferred to an assembler buffer 416. The assembler buffer 416 is a memory that serves as a temporary buffer to assemble packets that will be sent to the offload pipeline 425. In some embodiments the assembler buffer 416 may be located in another unit, such as for example in the payload manager 444, described below. Some embodiments do not include the assembler buffer 416, and the DMA transaction transfers the write data to a payload buffer 446, described below.

The processor 422a may also instruct the data mover 414 to add packet information (also called "PktInfo") to the write data. The packet information may include information about the write request, such as the identity of the virtual machine that requested the write and information about the storage device to which the write is directed. The packet information may also include information for the offload pipeline, such as commands for one or more units in the offload pipeline.

In some implementations, at this step the I/O adapter device 408 may examine the write data as it is transferred from the host DRAM 406 to the I/O adapter device 408, to see if the write data can be reduced in size. As described above, the write data may be viewed as consisting of blocks of equally-sized data. The I/O adapter device 408 may—using, for example, the host interface 410—examine the write data in blocks of data, and determine for each data block whether the data block is of a pre-determined data pattern or type. Data patterns are described above with respect to FIGS. 3A-3D and 4A-4D. Data blocks that are of the pre-determined data pattern may be excluded from the write data before the write data is transmitted, so that the transmitted write data may include primarily data blocks that are not of the pre-determined data pattern. In this manner, the size of the transmitted data may be reduced.

The size of the data blocks may be configured by software or hardware. The size of the data blocks may be configured for each individual write request, or for groups of write requests, or for all write requests. Alternatively or additionally, the size of the data blocks may be determined by a system configuration, such as for instance the transfer size allowed by the protocol used to transfer the write data to a storage location. Alternatively or additionally, the size of the data blocks may be determined by a block size used by the storage location. For example, storage locations, such as disk drives, may store data in blocks of 4 KB. Typically, the data blocks are all of the same size.

Returning to FIG. 5, the write data may be transferred from the host DRAM 406 to the host interface 410 in some unit of data. For example, when the interface between the host 404 and the host interface 410 is a PCIe interface, the write data may be transferred in units of 8 bytes per clock, which is one of multiple possible configurations for a PCIe interconnect. The number of bytes per transfer may be larger or smaller, as dictated by the transfer protocol or specific configuration between the host 404 and the I/O adapter device 408.

The number of bytes per transfer may not be the same as a data block size, which is typically larger. The I/O adapter device 408 may—using, for example, the host interface 410—examine and store each unit of data transferred, and maintain the current examination state. For example, the data pattern has been determined to be data that is all zero. The host interface 410 may maintain a "yes/no" state. The state is initially "do not know" until the first data is transferred into the host interface 410. As data is transferred from the host 404 into the host interface 410, the host interface 410 may determine whether the data is all zero. So long as each new data unit that is received is all zero, the state remains "yes." Once any data is received that contains any bits that are not zero, the state changes to "no" and remains "no." Once enough data has been received to comprise a whole data block, the state is reset, and the examination process restarts. Data blocks for which the state is "no" may continue through the I/O adapter device 408 as described below. Data blocks for which the state is "yes" may be withheld and optionally deleted at this stage.

The state for each data block is recorded so that it may be transmitted with the write data. The state may be stored in a bitmap. A bitmap contains at least one bit for each data block As discussed above with respect to FIGS. 4A-4D, in some implementations the number of data blocks may be configurable, and the bitmap may accordingly provide a sufficient number of bits to accommodate the range of configurability. Each bit maps to a data block. The bit may be set to "1" for data blocks whose final state is "yes" and "0" for data blocks whose final state is "no." Alternatively, "0" may be used to indicate "yes" and "1" may be used to indicate "no", as is convenient. The bitmap, or some equivalent method of recording the state of each data block, may accompany the data blocks that will continue through the I/O adapter's 408 offload pipeline. The bitmap may be included in a packet header, described in further detail below, or in the packet information.

Examining, at this stage, whether any data blocks from the write data are of a pre-determined data pattern may provide several advantages. In the steps described above the write data is first transferred into the I/O adapter device 408. This may the earliest point at which the write data can be examined, and a determination may be made that some data blocks from the write data can be eliminated to reduce the data transfer size. Reducing the data transfer size at this early stage may mean that less data need to be processed by the remainder of the offload pipeline. It can be recognized, however, that examining the write data at this stage may require that at least a data block size of data may need to be stored. Some implementations may avoid storing large amounts of data at this stage, and so may implement the examination process at a later stage, as described below.

FIG. 6 illustrates one embodiment of a packet flow 450 for moving a write packet for a write request described above through the preliminary stages of an offload pipeline 425. A write packet is a unit of data that is to be transmitted to the storage location. The write packet includes a header and a payload. The header includes information about the write request, such as for instance the location where the write data is to be written, the size of the write data, and/or error correction values, among other information. The header may further include protocol information that may be required to transmit the packet. The payload contains the write data.

First, the host interface 410 may send 452a the write packet, containing the packet information 458 and packet payload 454, to a packet parsing and steering 430 unit. The packet payload 454 contains the write data fetched from the host DRAM 406. The parsing and steering unit 430 may next send 452b the packet information 458 and packet payload 454 to a designated streaming FIFO 428 by way of a streaming interconnect 426. In some embodiments, the parsing and steering unit 430 may also initiate pre-fetching of a context for the virtual machine that initiated the write request. Streaming FIFOs 428 and the streaming interconnect 426 are described in further detail below.

As noted above, in some implementations, the write data may have been reduced in size by including data blocks that are not of a pre-determined data type. In these implementations, the packet payload 454 may contain the reduced size data. In other implementations, the data reduction has not yet occurred. In these implementations, the packet payload includes all of the write data.

FIG. 7 illustrates one embodiment of a flow 460 of the write packet through the offload pipeline 425 of the I/O adapter device 408. The offload pipeline 425 may be implemented as a combination of software and hardware. The offload pipeline 425 is illustrated here, by way of example, as including a number of streaming components, such as a parsing and steering 430 unit, a compression 432 unit, an encryption 434 unit, a splitter 436 unit, an assembler 438 unit, a network offloads 440 unit, a media access control (MAC) 442 unit, a payload manager 444, and a payload buffer 446. In some implementations, such streaming components may be implemented using hardware logic, such as ASIC, Field programmable Gate Arrays (FPGA) or similar digital hardware components that allow for some configurability enabled through one or more software interfaces. In some implementations, several streaming components may be included in hardware logic as subunits in the same system-on-a-chip (SOC). The offload pipeline 425 may include additional units not illustrated here, as necessary for other operations. In some embodiments, streaming FIFOs 428 enable passing of data between the units of the offload pipeline 425 and between the offload pipeline 425 and one or more processors 422. In some embodiments, the units of the offload pipeline 425 communicate with the streaming FIFOs 428 by way of a streaming interconnect 426. In some embodiments, the units or the streaming components of the offload pipeline 425 communicate with each other through the streaming interconnect 426, and to the processors 422 through the streaming FIFOs 428, by way of the streaming interconnect 426. In some implementations, the streaming components are configured to perform one or more packet processing operations for the I/O adapter device 408 and the streaming interconnect 426 is configured to route packets through the offload pipeline 425. The processors 422 communicate with the streaming FIFOs 428 through a separate interconnect 420. Software executed by the processors 422 may operate on the packet. The operation of the offload pipeline 425 can be modified and adapted by modifying the software executed by the processors 422.

As explained above with reference to FIG. 6, and as illustrated in FIG. 7, the parsing and steering unit 430 directs the write packet to a streaming FIFO 428. From the streaming FIFO 428, the write packet's packet information and payload are passed 462a to a compression 432 unit. The compression 432 unit may compress the payload. The compression 432 unit may then pass 462b the packet information and compressed payload to an encryption 434 unit through another streaming FIFO 428. The encryption 434 unit may encrypt the payload; for example, the encryption 434 unit may include a flow based Advanced Encryption Standard-XEX-TCB-CTS (AES-XTS) encryption engine. The encryption 434 unit may pass 462c the packet information and encrypted payload to a splitter 436 unit, by way of another streaming FIFO 428. The splitter 436 unit may request 462d payload buffer space from a payload manager 444. The splitter 436 unit may then place the write data payload in the payload buffer 446 at the designated space. The payload manager 444 may return a handle to the payload buffer 446. The splitter 436 unit may place the handle in the packet information and send 462e the packet information through a streaming FIFO 428 to a processor 422b.

In some implementations, the write data payload may be examined as it is transferred to the payload buffer 446, to see if the write data can be reduced in size. As described above, the write data may be viewed as consisting of blocks of equally-sized data. The I/O adapter device 408 may—using, for example, the splitter 436 or the payload manager 444—examine the write data in blocks of data, and determine for each data block whether the data block is of a pre-determined data pattern. Data blocks that are of the pre-determined data pattern may be excluded before the write data is transmitted, so that the transmitted write data may include primarily data blocks that are not of the pre-determined data pattern. In this way, the size of the transmitted data may be reduced.

The write data may be examined as the write data is passed 462d from the splitter 436 to the payload manager 444, or as the write data is written by the payload manager 444 to the payload buffer 444. When the write data is examined as the write data streams from one unit to another, the splitter 436 or payload 444 or whatever unit is executing the examination may maintain a current state of the data. The state is initially "do not know" until the first of the write data is seen. If the first data seen is of the pre-determined data pattern, the state becomes "yes"; if not, the state becomes "no." Once the state becomes "no" the state remains "no" until it is reset. If the state is "yes," the state remains "yes" only so long as the incoming data is of the pre-determined data pattern. Once enough data has been seen to comprise a whole data block, the state is reset.

Alternatively, the write data may be examined in a static state in the payload buffer 446. Once all the write data has been stored in the payload buffer 446, it may be examined in blocks without need to maintain a running state.

As discussed above, the final "yes/no" state may be stored in a bitmap, or some equivalent mechanism that is sent with the write data. The bitmap may be included in the packet header.

Some advantages may be provided by examining the write data as it is stored, or while it is stored, in the payload buffer 446. Since the write data is being stored already, no additional storage is needed to accumulate a data block's worth of data. Additionally, the write data is likely to undergo no further processing, and so is in a stable form.

It should be noted that the data reduction process described above is dissimilar from the data compression performed by the compression 432 unit. The data reduction process may eliminate data blocks' worth of data, essentially reducing these blocks of data to zero bits. Data compression typically does not reduce data to zero bits, even when the data is, for example, all zero. Furthermore, in some implementations compressed data may still be treated as occupying an entire logical block. For instance, data that has been compressed to only a few bits may still be treated as a logical block, depending on the particular compression algorithm and the storage system. Thus the compressed data may still occupy, for example, a 4 KB logical block. The data reduction process may thus provide even greater reduction in the size of the data than may be provided by compression alone.

Returning to FIG. 7, the processor 422b may perform protocol processing on the packet information, such as for example any necessary processing to prepare the write packet for transmission by a specific transmission protocol. The processor 422b may create a packet header for the write packet, where the packet header contains any necessary protocol information for transmitting the write packet.

Upon completion of any further processing, the processor 422b may pass 462f the packet information and packet header for the write packet to an assembler 438 unit, by way of a streaming FIFO 428.

The assembler 438 unit may request 462g the packet payload from the payload manager 444 and associate the payload with the packet information and the packet header. The assembler 438 unit may extract from the payload buffer 446 primarily data blocks that are not of the pre-determined data pattern, and not extract any data blocks that are of the pre-determined data pattern. Alternatively, the payload manager 444 may make the differentiation between data blocks that are or are not of the pre-determined data pattern, and provide to the assembler 438 unit only those data blocks that are not. The buffer space used by the payload data is freed for other use.

The assembler 438 unit passes 462h the packet, by way of a streaming FIFO 428, to the network offloads 440 unit. The network offloads 440 unit may perform stateless operations on the packet header and/or data, such as for instance checksum generation, UDP/IP checksum generation, and/or Ethernet CRC generation.

As described herein, embodiments may enable stateless operations on the portions of the write requests originating from a virtual machine host. "Stateless" here means that the network offloads 440 unit does not maintain state information between individual related write requests. Write requests may be related, for example, when the data written by multiple requests comprises a single set of data. When a single set of write data spans multiple write requests, an error correction value may be calculated for each write data portion written with each individual write request. Alternatively, a single error correction value for the entire write data can be calculated, in which case an error correction value state is maintained between the related write requests. In some embodiments, whether to calculate one error correction value or multiple error correction values is configurable. The configuration may be determined on a per request basis, per virtual device basis, per virtual machine basis, and/or per queue basis, depending on how the I/O adapter device 408 is configured. Any method may be employed to generate the error correction value; hence the error correction value may be, for example, a CRC or a checksum.

Upon completion of any operations, stateless or otherwise, the network offloads 440 unit will remove the packet information from the write packet, and send 462i the now completed write packet to a MAC 442 unit for transmission 462j to the storage location.

In some implementations, upon receiving the write packet, the storage location may reproduce any data blocks that were not sent in order to reduce the size of the transmitted data. More typically, however, storage location implementations may store the reduced-size write data without reproducing any data blocks. In these implementations the storage location may also store the bitmap that records that state of each of the original data blocks. The storage location may store the bitmap or some equivalent. In this way, the storage location records that the stored write data has been reduced in size, and can provide this information when the write data is read. Alternatively or additionally, the storage location may apply thin provisioning when storing the write data, according to the thin provisioning mechanism described above, to make more efficient use of the available disk space.

Figure 8:
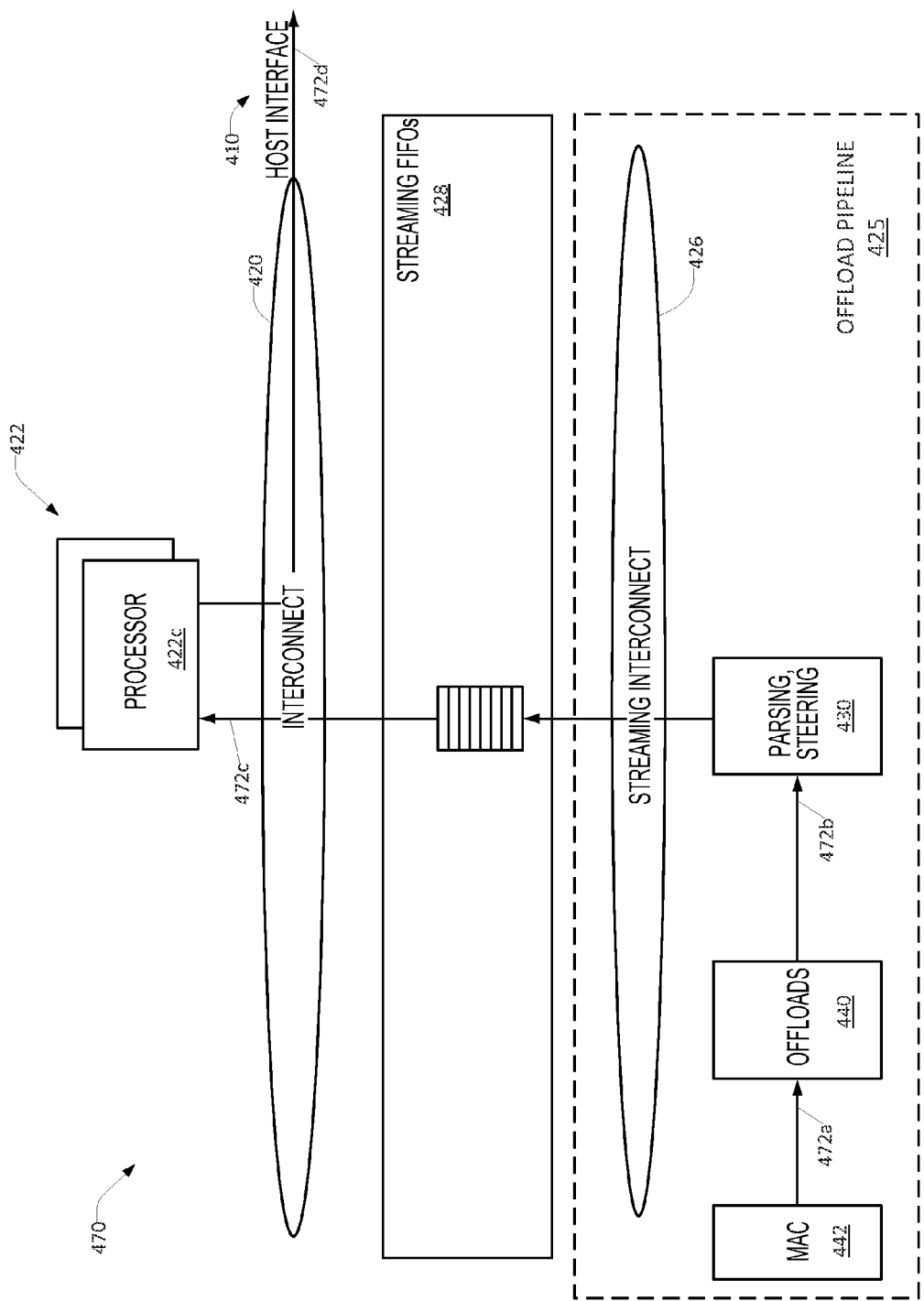
FIG. 8 illustrates one embodiment of a flow of a write response for a write request through the offload pipeline of the I/O adapter device.

FIG. 8 illustrates one embodiment of a flow 470 of a write response for a write request through the offload pipeline 425 of the I/O adapter device 408. The offload pipeline 425 is illustrated here, by way of example, as including a MAC 442 unit, a network offload 440 unit, and a parsing and steering 430 unit. The offload pipeline 425 may include additional units not illustrated here, as necessary for other operations.

The write response may be sent by the storage location to which the write request was directed, and may indicate that the write has completed. In some cases, the write response may indicate that an error occurred. In such cases, a processor 422c may examine the error and determine what, if anything, to do. In some cases, the processor 422c may inform the virtual machine that requested the write that an error occurred. In some embodiments, the processor 422c may handle the error and/or reissue the write request. In other embodiments, the offload pipeline 425 may be configured to reissue the write request without assistance from the processors 422c.

The flow 470 illustrated in FIG. 8 gives an example of a write response indicating that the write was successful. The write response packet for the write request is first received from the transmission medium at the MAC 442 unit. The MAC 442 unit passes 472a the response packet to the network offloads 440 unit. The network offloads 440 unit may perform stateless operations on the response packet, such as for instance checking an Ethernet CRC, IP or UDP checksum, or other error correction value included in the response packet. A write response packet typically (though not always) does not include a payload. Thus in some cases, the write response packet may include only an error correction value for the header, or no error correction values at all. Any results of the stateless operations may be added to a packet information that is generated for the response packet. The network offloads 440 unit passes 472b the response packet to the parsing and steering 430 unit.

The parsing and steering 430 unit parses the packet header for the response packet and may determine that the response packet should be routed to a particular processor 422c that is associated with ingress traffic. The parsing and steering unit 430 will therefore place the packet header and packet information in a streaming FIFO 428, from which it will be passed 472c to the processor 422c. In some embodiments parsing and steering 430 unit may also start pre-fetching a context state for the virtual machine that requested the write.

The processor 422c may process the packet header and packet information. For example, the processor 422c may perform protocol processing, such as network protocol processing, using the packet header, packet information, and context, as well as any other information that was attached to the write request. The processor 422c may issue 472d a completion request to the host interface 410. The completion request contains sufficient information for the host interface 410 to inform the virtual machine that requested the write that the write completed successfully.

The above description for the processing of write requests by an I/O adapter device illustrate embodiments that may implement transfer data size reduction. As noted above, in some implementations the I/O adapter may examine the write data in blocks to determine, for each data block, whether the data block is of a pre-determined data pattern. The I/O adapter device may in some implementations engage in this examination when the write data first enters the I/O adapter device, for example at a host interface. In other implementations, the I/O adapter device may examine the write data as it is stored or after it has been stored in an intermediate payload buffer. In all implementations, a write packet is prepared, where the packet payload includes data blocks that are not the pre-determined data pattern, excluding data blocks that are of the pre-determined data pattern. The packet header may include an indicator that indicates which of the blocks of data from the write data are of the pre-determined data pattern (and, conversely, which are not). The packet header may include a bitmap to provide this indication.

This process for reducing the size data that is transferred by a write request may reduce the amount of bandwidth used by a write packet. In some cases, the payload size may even be reduced to zero bits. Reducing the transfer data size may also be advantageous once the write packet reaches a destination storage location. The storage location may be configured to store the reduced-sized data, as well as the indicator or bitmap that indicates which data blocks are not included. The storage location need not reproduce the excluded data blocks. In this manner, disk space may be used more efficiently.

When data stored in this manner is later read, the original write data can be provided to one who issues a read request for the data. Using the indicator or bitmap and the pre-determined data pattern, the original write data can be read back. Implementations for reading reduced size data are discussed below.

IV. Read Requests

Figure 9:
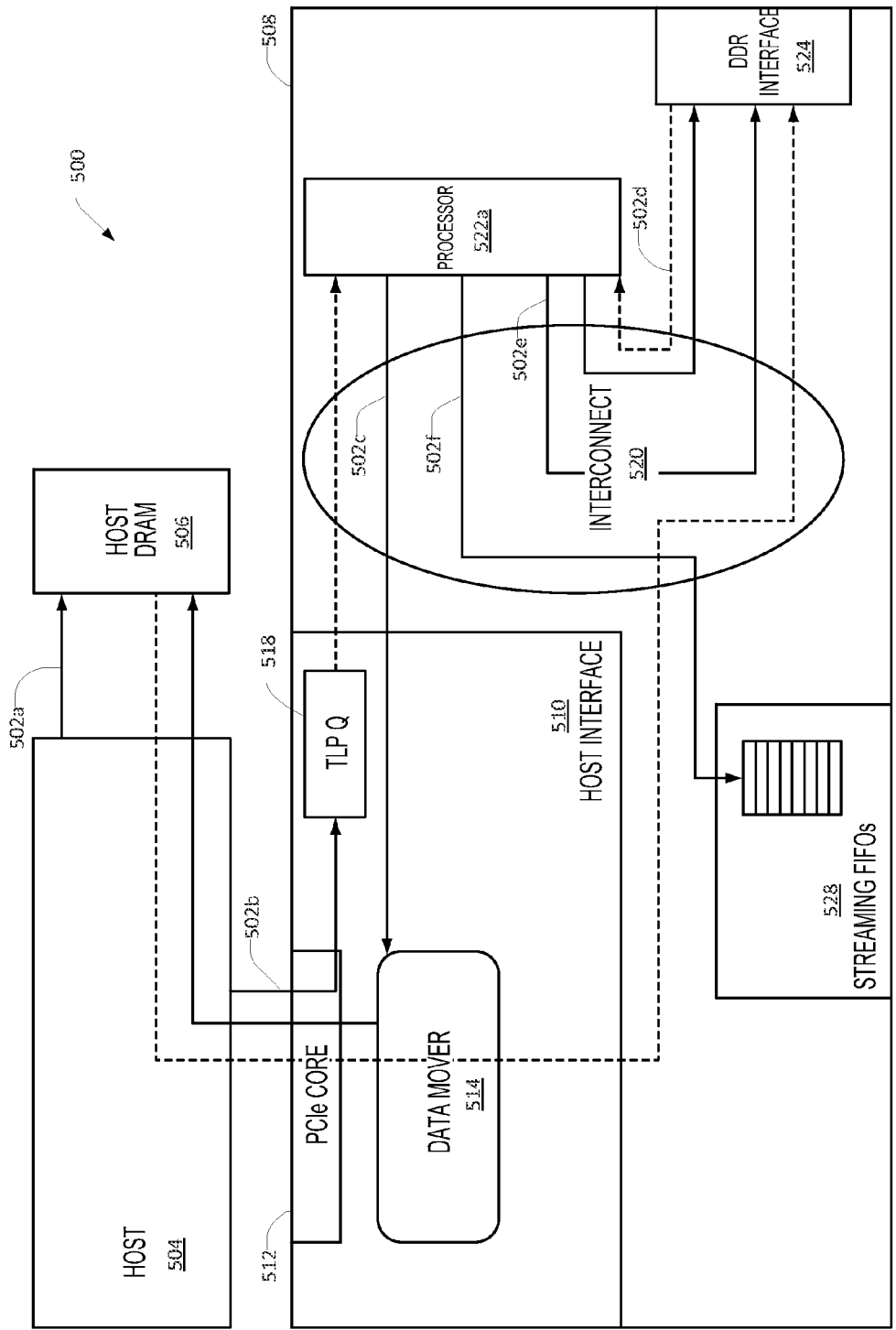
FIG. 9 illustrates one embodiment of a system for implementing a storage read request, where the read request may be targeted to a storage location.
Figure 10:
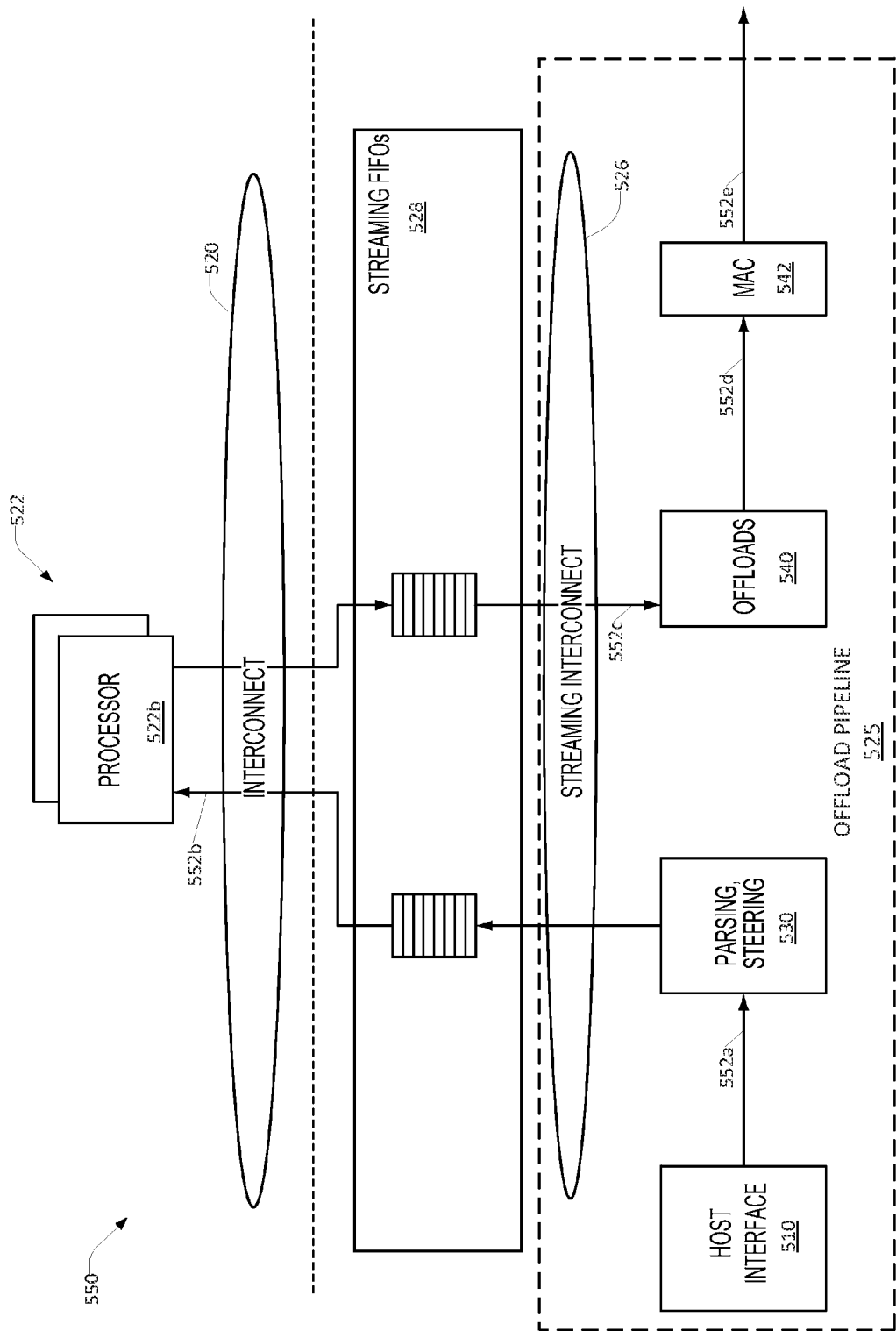
FIG. 10 illustrates one embodiment of a flow for moving a read packet for a read request through an offload pipeline.
Figure 11:
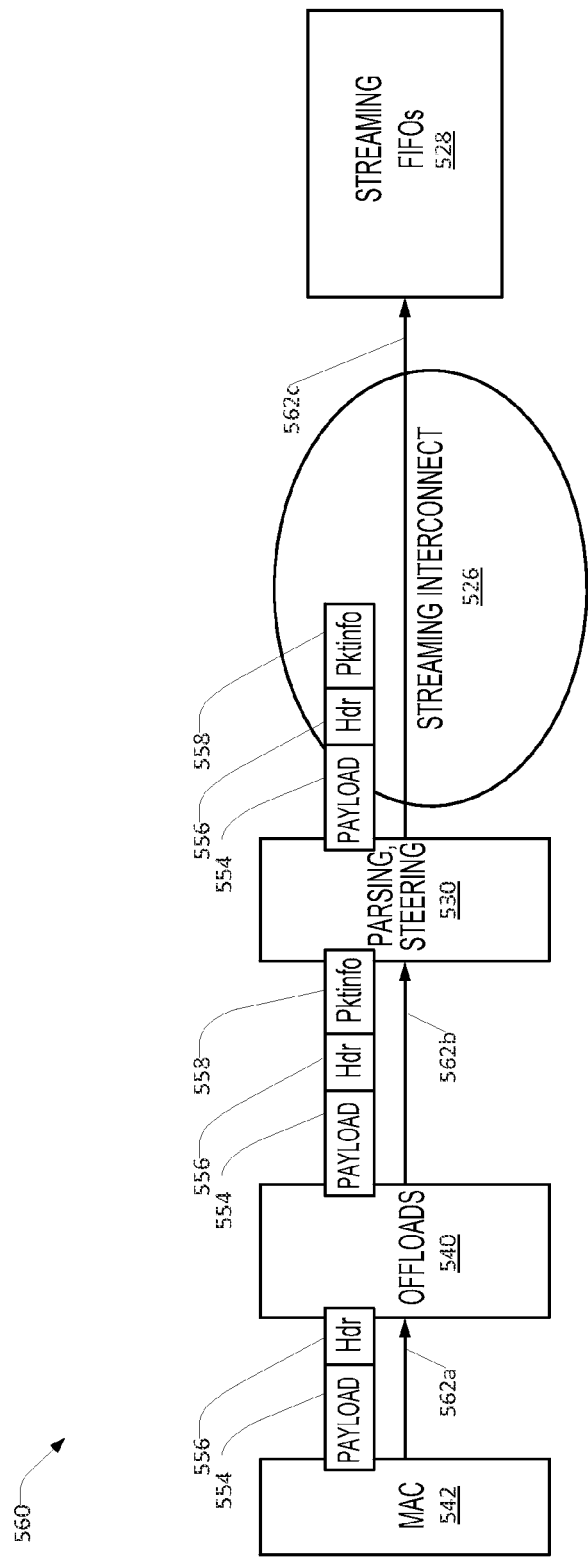
FIG. 11 illustrates one embodiment of a packet flow for receiving a response to a read request.

FIGS. 9-12 illustrate one embodiment of an I/O adapter device configured to process a read request. FIGS. 9-12 illustrate general and flexible read request processes, configured for most variants of read requests, special read cases, and management of errors. These figures illustrate how a read request is transferred from a virtual machine on a host device to an I/O adapter device (FIG. 9). The read request flows through an offload pipeline on the I/O adapter device, where it is processed and sent to a storage location (FIG. 10). A read request may receive one or more response packets from the storage location, where the response packets contain the requested read data. These response packets are transferred from the network interface to the I/O adapter device's offload pipeline (FIG. 11). The read response packets flow through the offload pipeline, where they are processed (FIG. 12), and once all the response packets are received, the I/O adapter device informs the virtual machine that the read request has completed.

FIG. 9 illustrates one embodiment of a system 500 for implementing a storage read request, where the read request may be targeted to a storage location. The read request may be targeted to a storage device, such as a remote computing device, a network attached storage device, and/or a direct-attached storage device.

Also illustrated in FIG. 9 are the initial steps to execute a read request. The read request is transferred from a virtual machine on a host device 504 to an I/O adapter device 508. In some instances, the read request originates from a virtual machine executing on the host device 504. The I/O adapter device processes the read request through an offload pipeline 525, discussed in further detail below, and transmits the read request to the targeted storage location, for example through a network interface port.

FIG. 9 illustrates one embodiment of the steps by which a read request may be transferred from a virtual machine on a host device 504 to an I/O adapter device 508. In some embodiments, the communication channel between the host 504 and the I/O adapter device 508 takes the form of a PCIe interface; in such embodiments, the host interface 510 may include a PCIe core 512.

As a first step, the virtual machine on the host device 504 posts 502a a read request by, for example, allocating read buffer space in the host DRAM 506. The data being read is to be placed in this read buffer space. The virtual machine may also write other information about the read request to host DRAM 506, such as a packet descriptor, which indicates where in the host DRAM 506 the read buffer space is located.

As a second step, the virtual machine on the host 504 may notify 502b the I/O adapter device 508 that it has posted 502 the read request. In some embodiments the I/O adapter device 508 communicates with the host 504 over a PCIe communication channel. In such embodiments, the notification 502b may take the form of a doorbell write. The doorbell write is steered to a Transaction Layer Packet (TLP) queue 518 that is associated with a processor 522a. The processor 522a is one of one or more processors included in some embodiments of the I/O adapter device 508. Any of the one or more processors may be designated for specific tasks, such as handling I/O requests from a specific virtual device. Individual processors may be implemented as ARM cores. The processors communicate with the host interface 510 through an interconnect 520. In some embodiments, such as embodiments in which the processors are implemented as ARM cores, the interconnect 520 can be an AXI interconnect.

As a third step, information about the read request is transferred from the host 504 to the I/O adapter device 508. The processor 522a may instruct 502c a data mover 514 to fetch information about the read request from the host DRAM 506. For example, the data mover 514 may fetch the packet descriptor, which indicates where in the host DRAM 506 the data to be read is to be placed. The packet descriptor, and/or other information about the write request, may be placed in a DDR through a DDR interface 524 on the I/O adapter device 508. In some embodiments, the processor 522a may have pre-fetched the packet descriptors, and thus not need to fetch the packet descriptors at this stage.

At a fourth step, the designated processor 522 may read 502d descriptor information from DDR through the DDR interface 524 on the I/O adapter device 508. The descriptors stored in the DDR include information about the read request. For example, the descriptors may include the request type, the size of the data to be transferred by the request, where the data is to be placed in the host DRAM 506, and/or where in the I/O adapter's payload buffer the data may be temporarily stored. Descriptors may be placed in the DDR through the DDR interface 524 when the read request is initially transferred to the I/O adapter device 508. The I/O adapter device 508 may add the descriptor to a list of descriptors. For example, the read request may be added to a submission queue. The descriptor information may indicate that more descriptors should be fetched from the host DRAM 506.

As a fifth step, the processor 522a may record 502e, through the DDR interface 524, information about the read request. For example, the processor 522a may record 502e where the read data for the read request should be placed in the host DRAM 506. In some embodiments, the processor 522a may also generate instructions for the data mover 514 with this same information.

As a sixth step, the processor 522a may form packet information ("PktInfo") and place 502f the packet information in a streaming FIFO 528 that may be associated with egress transactions. The packet information may contain information about the read request, such as the identity of the virtual machine that requested the read and storage access information for the storage location that contains the data to be read.

FIG. 10 illustrates one embodiment of a flow 550 for moving a read packet for a read request through an offload pipeline 525. A read packet is a unit of data that is to be transmitted to the storage location. The read packet includes a header and a payload. The header includes information about the read request, such as for instance the location where the read data is to be read, the size of the read data, and/or error correction values, among other information. The header may further include protocol information that may be required to transmit the packet. The payload may be empty, or may include auxiliary information to be sent to the storage location.

The read packet is processed by the offload pipeline 525 and is transmitted to the storage location. The offload pipeline 525 is illustrated here, by way of example, as including a host interface 510, a parsing and steering 530 unit, a network offloads 540 unit, and a MAC 542 unit. In some implementations, several streaming components may be included in hardware logic as subunits in the same SOC. The offload pipeline 525 may include additional units not illustrated here, as necessary for other operations. In some embodiments, streaming FIFOs 528 enable passing of data between the units of the offload pipeline 525, and between the offload pipeline 525 and one or more processors 522. In some embodiments, the units of the offload pipeline 525 communicate with the streaming FIFOs 528 by way of a streaming interconnect 526. In some embodiments, the units or the streaming components of the offload pipeline 525 communicate with each other through the streaming interconnect 526, and to the processors 522 through the streaming FIFOs 528 by way of the streaming interconnect 526. In some implementations, the streaming components are configured to perform one or more packet processing operations for the I/O adapter device 508 and the streaming interconnect 526 is configured to route packets through the offload pipeline 525. The processors 522 communicate with the streaming FIFOs 528 through a separate interconnect 520. Software executed by the processors 522 may operate on the packet. The operation of the offload pipeline 525 can be modified and adapted by modifying the software executed by the processors 522.

As explained above with reference to FIG. 9, and as illustrated in FIG. 10, the host interface 510 will send 552a the packet information to a parsing and steering 530 unit. The parsing and steering 530 unit may parse the packet information and determine that the read packet should be routed to a particular streaming FIFO 528. The particular streaming FIFO 528 may be associated with egress data for the virtual machine that requested the read. The parsing and steering 530 unit communicates with the streaming FIFOs 528 by way of a streaming interconnect 526. In some embodiments the parsing and steering 530 unit may also initiate prefetching of a context that is associated with the virtual machine that requested the read.

The parsing and steering 530 unit may pass 552b the packet information for the read request to a processor 522b by way of a streaming FIFO 528. The processor 522b accesses the streaming FIFOs 528 through an interconnect 520. In some embodiments, the processors 522 are implemented as ARM cores. In such embodiments, the interconnect 520 may be an AXI interconnect. The processor 522b may perform operations on the packet information, such as for instance network protocol processing. The processor 522 may generate a packet header, which includes any necessary network protocol information.

Upon completion of any further processing, the processor 522b may pass 552c the packet information and packet header to a network offloads 540 unit.

The network offloads 540 unit may perform operations on the packet information and/or packet header. For example, the network offloads 540 unit may perform stateless operations, such as Ethernet CRC generation, UDP or IP checksum generation, or any other checksum generation. The network offloads 540 unit may further remove the packet information and send 552d the now completed packet to a MAC 542 unit. The MAC 542 unit may then send 552e the packet out onto the network.

In some implementations, the storage location that is the target of a read request may have stored the read data in a reduced size. That is, the data may have been reduced in size according the processes illustrated in FIGS. 3A-3D and FIGS. 4A-4D, and the data that was reduced in this manner was stored at the storage location, along with an indicator or bitmap that indicates which data blocks were included and excluded. The storage location may have also applied thin provision to make more efficient use of the available disk space. In such implementations, upon receiving a request for reduced-size data, the storage location may respond by reproducing any data blocks that were not included when the data was originally stored, and providing both the reproduced data and the stored data in a read response packet. More typically, however, the storage location may respond by providing only the stored data and the indicator and bitmap in the read response packet. In this way, the size of the data transferred from the storage location to the requester (e.g., an I/O adapter device) may be reduced.

FIG. 11 illustrates one embodiment of a packet flow 560 for receiving a response packet to a read request. A read response packet may be sent by the storage location to which a read request was directed. In some situations, multiple read response packets may be sent, each containing a part of the total read data. The read response packet may indicate that the read request reached the target storage location successfully, and that the read response packet includes the requested data. Alternatively, the read response packet may indicate that an error occurred. In such cases, a processor 522c may examine the error. In some cases, the processor 522c may inform the virtual machine that requested the read that an error occurred. In some cases, the processor 522c may handle the error and/or reissue the read request. In other cases, the offload pipeline 525 may be configured to reissue the read request without assistance from the processors 522c.

A read response packet will be received by the MAC 542 unit. The read data may arrive in multiple response packets. As each read response packet arrives, the read data associated with each response packet will be sent to the host DRAM 506, for instance, by initiating a DMA write to the host DRAM 506. The partial read data will not usually be stored on the I/O adapter device 508.

When the MAC 542 unit receives a read response packet, it will pass 562a the packet payload 554 and packet header 556 to the network offloads 540 unit. The network offloads 540 unit may perform operations on the packet, such as for instance stateless operations, including checking an Ethernet CRC, an IP or UDP checksum, or any other checksum.

As explained above, "stateless" here means that the network offloads 540 unit does not maintain state information between the individual related read requests. Read requests may be related, for example, when the data being read by multiple requests comprises a single set of data. When a single set of read data spans multiple read requests, an error correction value may be calculated for each portion of the read data returned with each read response packet. Alternatively, a single error correction value may be calculated, in which case an error correction value state is maintained between the related read requests. In some embodiments, whether to calculate one or multiple error correction values is configurable. The configuration may be determined on a per request basis, per virtual device basis, per virtual machine basis, and/or per queue basis, depending on how the I/O adapter device 508 is configured.

Upon completion of any operations, stateless or otherwise, the network offloads 540 unit may place the result of such operations in the packet information 558. The network offloads 540 unit may then pass 562b the payload 554, header 556, and packet information 558 to the parsing and steering 530 unit.

The parsing and steering 530 unit may parse the packet header and determine that the packet should be routed to a particular streaming FIFO 528 that is associated with ingress traffic. The parsing and steering 530 unit may add information to the packet information 558 before directing 552c the packet to a streaming FIFO 528 by way of the streaming interconnect 526. In some embodiments, the parsing and steering 530 unit may also initiate prefetching of a context associated with the virtual machine that requested the read.

In some implementations, the packet header may indicate that some data blocks from the requested data are of a pre-determined data pattern. Requested data here means the data that the virtual machine that requested the data—which may be unaware of any data size reduction—is expecting to receive, which may not be the same as the data that is included in the response packet payload. As discussed above, the response packet payload may include data that has been reduced in size according to, for example, the data reduction processes described above for write requests. The response packet header may thus indicate which data blocks from the original data are included in the packet payload, and which are not. The packet header may include, for example, a bitmap, where a bit from the bitmap corresponds to a block of data. A data block may have been excluded from the packet payload when the data block was of a pre-determined data pattern. The packet payload may thus include primarily data blocks that were not of the pre-determined data pattern.

The response packet header may also provide additional information, such as the size of the data blocks, the size of the bitmap, the number of bits in the bitmap that are in use, and/or an identification of the data pattern. Alternatively or additionally, this information may be configured in advance.

The parsing and steering 530 unit may examine the packet header to determine which of the requested read data blocks are of the pre-determined data pattern, and which are not. In some implementations, the parsing and steering 530 unit may further reconstruct the requested read data. For example, the packet header may provide a bitmap that indicates which data blocks are of the pre-determined data pattern and which are not. Specifically, the bitmap may contain the values "0110," where "1" indicates that the corresponding data block is of the pre-determined data pattern and "0" indicates that the corresponding data block is not of the pre-determined data pattern.

The parsing and steering 530 unit may further use the bitmap to reconstruct the requested read data. For each bit that indicates that a data block is of the predetermined data pattern, the parsing and steering 530 unit may generate the data block. For each data bit that indicates that a data block is not of the pre-determined data pattern, the parsing and steering 530 unit may retrieve the data block from the packet payload. Specifically, to continue the above example and assuming that the pre-determined data pattern is data of all zeroes, for the bitmap values "0110" the first data block is provided from the packet payload; the second and third data blocks are each generated as data blocks of all zero, and the fourth data block is provided from the packet payload. As can be seen from this example, the bitmap may also indicate the order for each of the data blocks. For example, the first data block in the example may be the first data block in the payload, while the fourth data block may be the second data block in the payload.

The requested read data may be reconstructed in this fashion as the data is transferred over the streaming interconnect 526 to the streaming FIFOs 528, for further processing by the offload pipeline 525.

Figure 12:
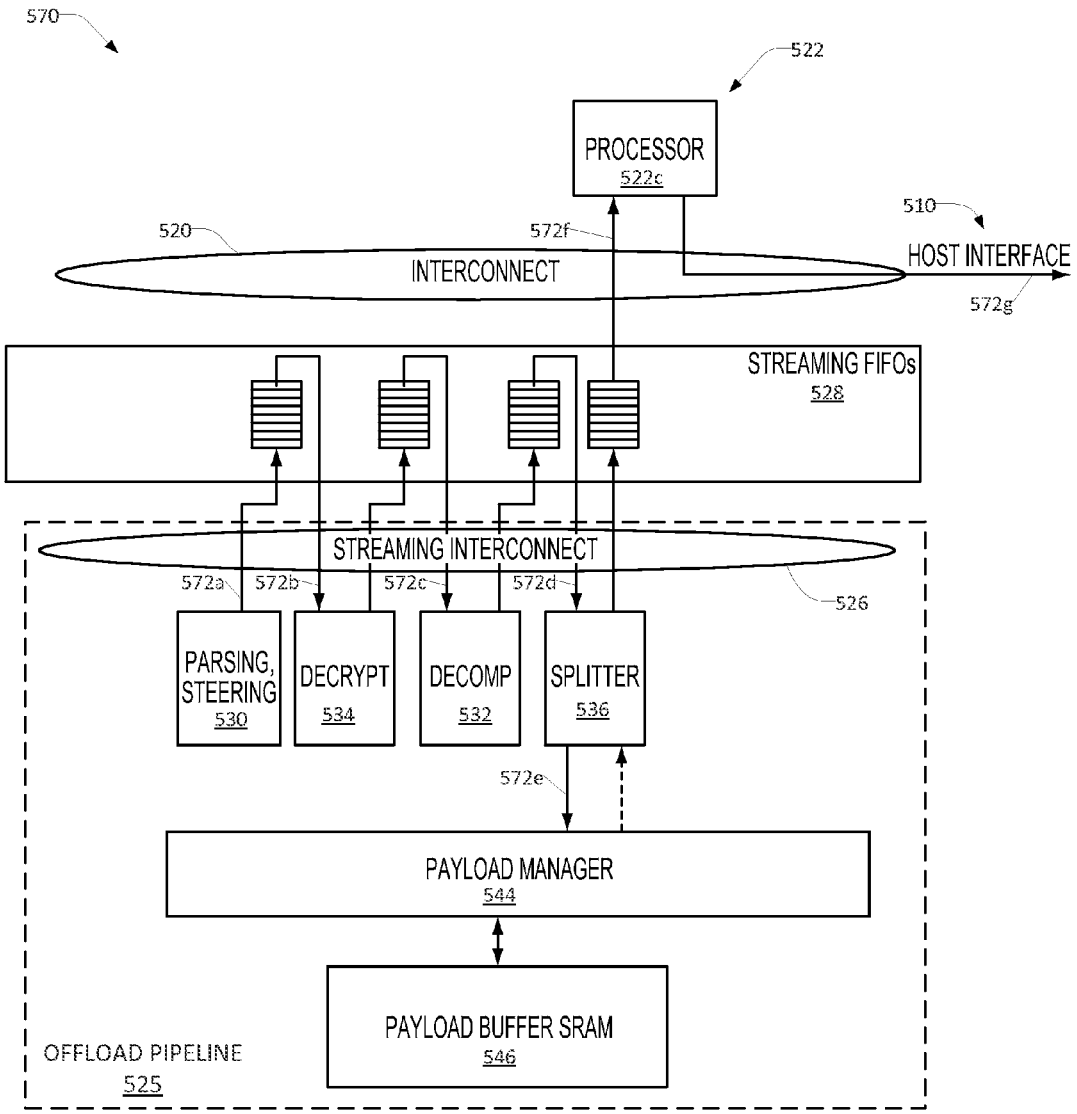
FIG. 12 illustrates one embodiment of a flow of the read response for a read request through the offload pipeline of the I/O adapter device.

FIG. 12 illustrates one embodiment of a flow 570 of the read response packet for a read request through the offload pipeline 525 of the I/O adapter device 508. The offload pipeline 525 is illustrated here, by way of example, as including a parsing and steering 530 unit, a decryption 534 unit, a decompression 532 unit, a splitter 536 unit, a payload manager 544, and a payload buffer 546. The offload pipeline 525 may include additional units not illustrated here, as necessary for other operations. Streaming FIFOs 528 pass data between the units of the offload pipeline 525, and between the offload pipeline 525 and one or more processors 522. The units of the offload pipeline 525 communicate with the streaming FIFOs 528 by way of a streaming interconnect 526. The processors 522 communicate with the streaming FIFOs 528 through a separate interconnect 520.

The read response packet may be sent by the storage location to which the read request was directed, and includes the requested read data. In some cases, the read response packet may indicate that an error occurred. In such cases, a processor 522c may examine the error and determine what, if anything, to do. In some cases, the processor 522c may inform the virtual machine that requested the read that an error occurred. In some embodiments, the processor 522c may handle the error and/or reissue the read request. In other embodiments, the offload pipeline 525 may be configured to reissue the read request without assistance from the processors 522c.

The flow 570 illustrated in FIG. 12 gives an example of a read response packet indicating that the read was successful. The read response packet is received by the offload pipeline 525 as described with respect to FIG. 11, where the response packet is last seen being passed from the parsing and steering 530 unit to a streaming FIFO 528. FIG. 12 also illustrates the parsing and steering 530 unit passing 572a the packet payload, packet header, and packet information to a streaming FIFO 528. The parts of the response packet are directed 572b to a decryption 534 unit. The decryption 534 unit may decrypt the packet payload. For example, the decryption 534 unit may include an AES-XTS decryption module. After decryption, the decryption 534 unit sends 572c the packet to the decompression 532 unit through a streaming FIFO 528. The decompression 532 unit may perform decompression on the decrypted read data payload. The decompression 532 unit sends 572d the decompressed read data payload to the splitter 536 unit by way of a streaming FIFO 528. The splitter 536 unit may request 572e buffer space for the read data payload. The payload manager 544 may return a handle to the payload buffer 546, where the handle indicates where the read data payload is to be written in the payload buffer 546. The splitter 536 unit uses the handle to write the read data payload to the payload buffer 546, and sends 572f the packet header to a processor 522 by way of a streaming FIFO 528.

In some implementations, the splitter 536 unit may reconstruct the requested read data. In these implementations, the data has not been reconstructed by the parsing and steering unit 530 as described above. Instead, the splitter 356 unit may examine the packet header to determine which if any blocks of data from the requested read data are of a pre-determined data pattern. Using this information, which may be indicated with a bitmap, the splitter 536 unit may generate data blocks that are of the pre-determined data pattern. The splitter 536 unit may further provide data blocks that are not of the pre-determined data pattern from the payload buffer 546.

In some implementations, the reconstruction process may be provided by the payload manager 544. In other implementations, the reconstruction process may be provided by a processor 522c. In yet other implementations, the reconstruction process may be provided by the host interface 510. In these implementations, the requested read data may be reconstructed as the read data is sent to the host that originated the read request. For example, the host interface 510 may generate DMA write transactions to transfer the requested read data to the host 504. When a block of data is not of the pre-determined data pattern, the DMA transaction can be provided with data from the read response payload. In contrast, when the data block is of the pre-determined data pattern, the DMA transaction can be provided with data that is generated at the moment the DMA transaction is initiated. In such implementations, the I/O adapter device may be able to avoid storing the generated data block, and thereby more efficiently use available memory.

A processor 522c may operate on the packet header. For example, the processor 522c may execute protocol processing, such as network protocol processing, on the packet header. The processor 522c may then notify the host interface 510 that the read data payload should be transferred 572g from the payload buffer 546 to the host DRAM 506. In some embodiments, the processor 522a may instruct the host interface 510 to execute a DMA request. The host interface 510 may execute the DMA request to transfer 572g the read data from the payload buffer 546 to the host DRAM 506. The DMA request may also contain information for the host interface 510 to perform completion actions, where the completion actions notify the virtual machine that requested the read that the read is complete.

In some embodiments, the processor 522 may recognize that the response packet contained only a frame-size amount of data, which may happen when the data requested by the read request was larger than a pre-determined frame size. When such is the case, the sender of the read response packet may send multiple, frame-size read response packets containing equal to or less than a frame-size amount of data. The processor 522 may in such cases be configured to expect multiple frame-size read response packets for a single read request, and will initiate DMA requests to transfer the frame-size read data from each of these response packets to the host DRAM 506. The processor 522 may further not treat the read request as completed until all the frame-size read response packets have been received.

The above description for the processing of read requests by an I/O adapter device illustrate embodiments that may implement transfer data size reduction. As noted above, data may be stored at a storage location in a size-reduced form, along with an indicator that indicates that some data blocks have been removed from the original data. When data stored in this manner is read, the indicator is transferred along with the reduced-size data. When the I/O adapter device receives the reduced-size data, in a read response packet, the I/O adapter device may reproduce the requested data by generating the data blocks that are of the pre-determined data pattern and providing the data blocks that are not of the pre-determined data pattern from the response packet payload.

Reducing the size of transfer data by excluding data blocks of a pre-determined data pattern may provide several advantages. Storing reduced-size data may allow a storage location to make more efficient use of available disk space. For read requests, a read response packet that includes reduced-size data may increase the efficiency of mediums used for transferring data. In some cases, the size of the data may even be reduced to zero.

Figure 13:
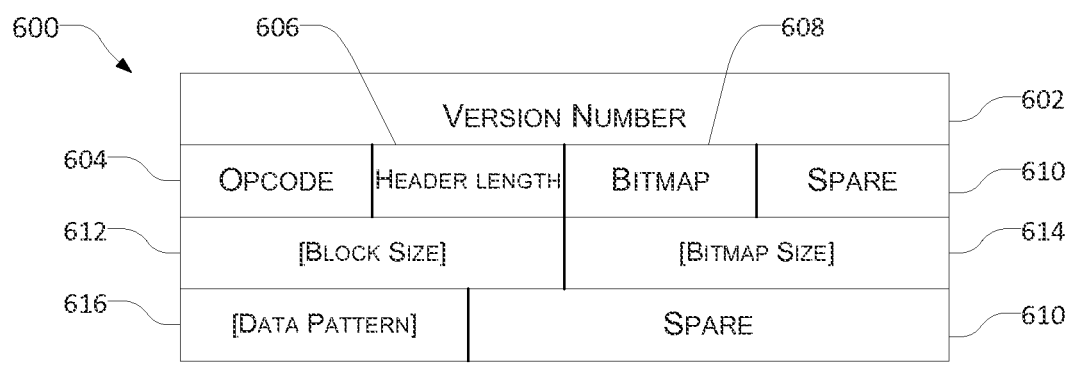
FIG. 13 illustrates an example of a format for a packet header to illustrate how a packet header may indicate which data blocks are of a pre-determined data pattern and which are not.

FIG. 13 illustrates an example of a format 600 for a packet header to illustrate how a packet header may indicate which data blocks are of a pre-determined data pattern and which are not. A packet header typically provides information about the packets, such as for example an indicator (such as an address) of the source of the packet, an indicator (such as an address) for the destination of the packet, information about the contents of the packet, and/or information required by the protocol used to transmit the packet.

The format 600 illustrated in FIG. 13 provides one example of a packet header that may include additional information as necessary, and/or can be extended as needed. The format 600 may include a version number 602 field. The version number 602 may indicate one among several various available versions of the packet header. The format 600 may also include a operation code, or "opcode" 604 field that indicates the type of operation to be executed by the packet. The format 602 may further include a header length 606 field. The header length 606 may specify the size of the packet header, in either number of bits, number of bytes, number of words (where a word is a certain number of bits long), or number of segments (where a segment is a certain number of bytes, such as a minimum transfer unit (MTU) as used by certain transmission protocols).

The format 600 may further include an indicator for indicating which data blocks are of a pre-determined data pattern. The indicator may, for example, be in the form of a bitmap 608. The number of bits in the bitmap 608 may be fixed, or may be configurable. The number of bits in the bitmap 608 may further have a one-to-one correspondence with the number of blocks in the data, or may be greater than the number of blocks, in situations where the size of the data blocks and the bitmap may be configurable.

The format 600 may further include some number of spare fields 610. The spare fields 610 may be used for additional information. The additional information may be defined in different ways for different uses of the packet header. For example, the spare fields 610 may be defined differently for different version numbers 602. Alternatively or additionally the spare fields 610 may be defined differently for different opcodes 604. The spare fields 610 may also be used to extend the uses of the packet header. For example, in some implementations a spare field 610 may be used to indicate a data block size 612, shown in the FIG. 13 in brackets to indicate that the data block size 612 field may be optional. As another example, in some implementations a spare field 610 may be used to indicate the bitmap size 614, shown in brackets to indicate that the bitmap size 614 may be optional. Alternatively or additionally, a spare field 610 may be used to optionally designate the pre-determined data pattern 616.

V. Methods

Figure 14:
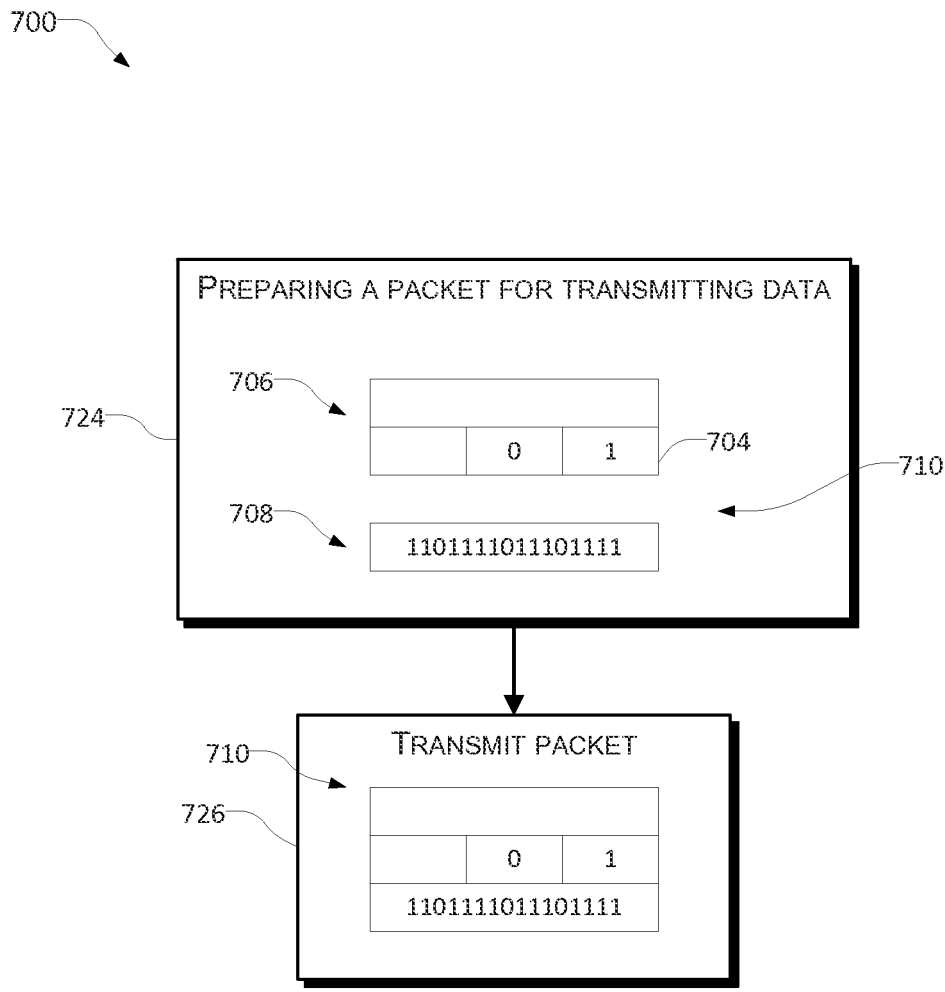
FIG. 14 illustrates one embodiment of a process for preparing and transmitting a packet that includes data that has been reduced in size.
Figure 15:
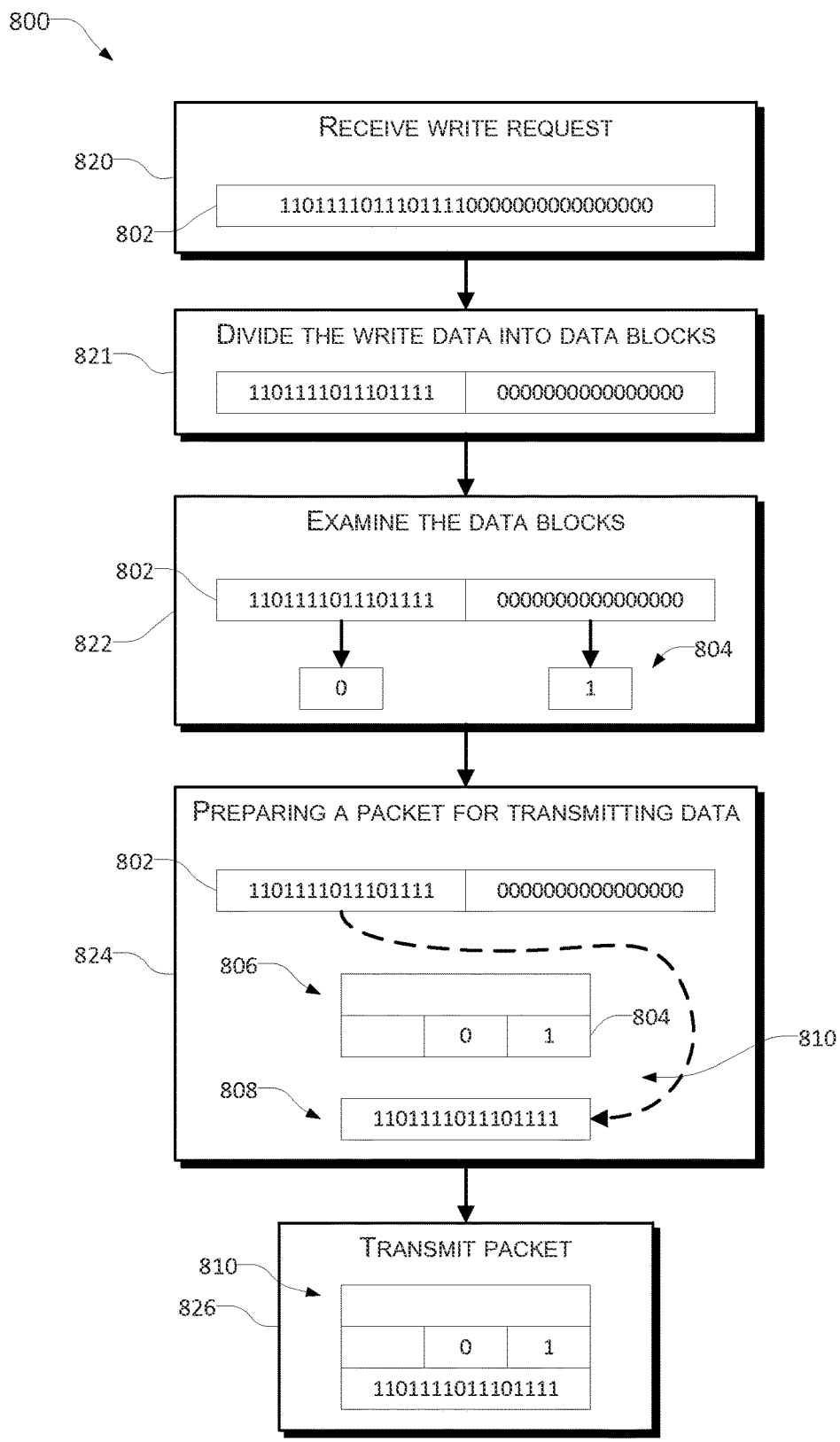
FIG. 15 illustrates one embodiment of a process for processing a write request, including reducing the size of the write data.
Figure 16:
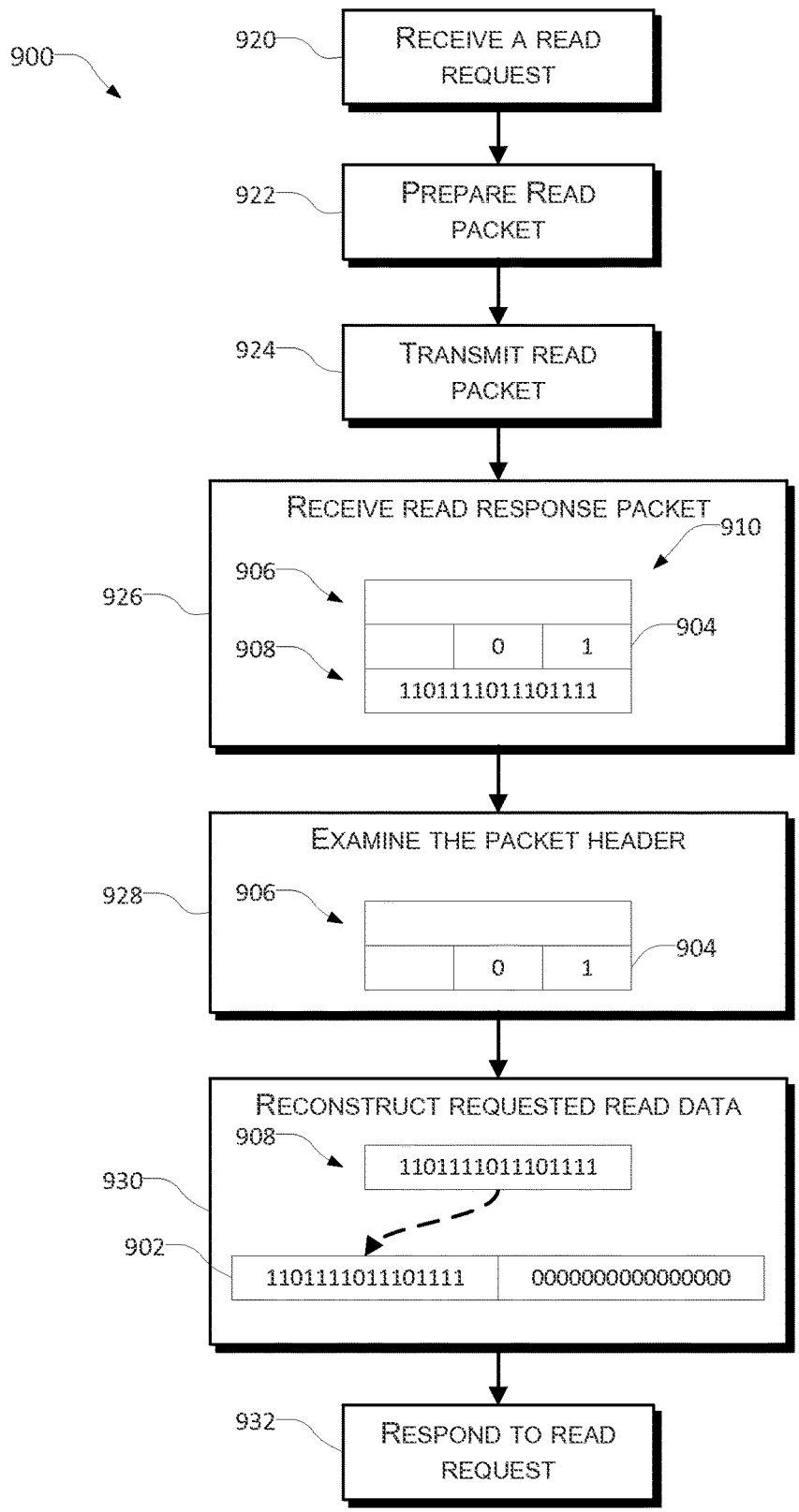
FIG. 16 illustrates one embodiment of a process for processing a read request, including reproducing the requested read data.

FIGS. 14-16 illustrate embodiments of methods for reducing the size of transferred data, and/or receiving data reduced size data and reconstructing the original data. These methods may be implemented by the systems described above.

FIG. 14 illustrates one embodiment of a process 700 for preparing and transmitting a packet that includes data that has been reduced in size. At step 724, a packet 710 is prepared, where the packet is for transmitting data. The packet 710 includes a packet header 706 and a packet payload 708. The packet header 706 indicates, for example with a bitmap 704, which data blocks from the data being transmitted are of a pre-determined data pattern. Data patterns may include data consisting of a certain bit pattern. For example, a bit pattern may be all zeroes, all ones, repeating patterns of bits, or a known and readily identifiable string of bits. The packet 706 may indicate which data blocks are of the pre-determined data pattern using a bitmap 704. The packet header 706 may further include other information, as necessary for transmitting the packet 710.

The packet payload 708 may include data blocks from the data being transmitted that are not of the pre-determined data pattern. Because the packet payload 708 may include data blocks that are not of the pre-determined data pattern, the packet payload 708 may be reduced in size from the original data.

At step 726 the packet prepared in step 724 is transmitted. Packets transmitted according to this process 700 may be transmitted from, for example, an I/O adapter device to a storage location. Packets transmitted according to this process 700 may also be transmitted from a storage location to an I/O adapter device.

FIG. 15 illustrates one embodiment of a process 800 for processing a write request, including reducing the size of the write data 802. This process can be performed by the I/O adapter device 102 and/or one or more CPUs as illustrated in FIG. 1, or any other suitable combination of hardware, software, and/or firmware.

As illustrated in FIG. 15, at step 820 a write request is received. The write request may be from a host device. The write request includes write data 802, where the write data 802 is the data to be transferred.

At step 821, the write data is divided into data blocks. As discussed above, the write data can be viewed as consisting of a number of data blocks. At step 821, the process 800 divides or treats the data as consisting of data blocks, in preparation for the next step. This division of the write data may not necessarily be literal, and may only be the manner in which the data is viewed.

At step 822, the process 800 examines the write data 802 in blocks of data. A block of data is a pre-determined number of bits that form the write data 802. For example, the write data 802 may consist of two blocks of 4 KB each. Examining the write data 802 includes determining, for each data block, whether the data block is of a pre-determined data pattern. Data patterns may include data consisting of a certain bit pattern, as discussed above.

At step 824, a packet 810 is prepared for transmitting the write data 802. A packet 810 includes a packet header 806 and a packet payload 808. The packet header 806 indicates 804 which data blocks are of the pre-determined data pattern. The indicator 804 may be in the form of a bitmap, included in the packet header 806. The packet payload 808 includes the data blocks from the write data 802 that are not of the pre-determined data pattern. Any data blocks that are of the pre-determined data pattern may be excluded from the packet payload 808.

At step 826, the packet 810 prepared in step 824 is transmitted. Packets transmitted according to this process 800 may include all of, part of, or none of the write data 802, depending on the result of the examination process in step 822. In this manner, the size of the data transferred for the write request may be reduced in size.

FIG. 16 illustrates one embodiment of a process 900 for processing a read request, including reproducing the requested read data 902. This process can be performed by the I/O adapter device 102 and/or one or more CPUs as illustrated in FIG. 1, or any other suitable combination of hardware, software, and/or firmware.

As illustrated in FIG. 16, at step 920 a read request is received. The read request may be from a host device. At step 922 a read packet is prepared for the read request. The read packet may include information such as the identity of the source of the read request, the identity of the target of the read request, the address of the requested read data 902, and/or the size of the requested read data 902. At step 924 the read packet is transmitted.

At step 926 a read response packet 910 is received. The read response packet 910 includes a packet header 906 and a packet payload 908.

At step 928 the packet header 906 is examined. The packet header 906 may indicate 904 which data blocks from the requested read data 902 are of a pre-determined data pattern. The request read data 902 here is the data that the host device is expecting to see; the host device may not be aware that any data reduction has taken place. The indicator 904 in the packet header 906 may further indicate the placement of any data blocks of the pre-determined pattern within the requested read data 902. For example, the indicator 904 may take the form of a bitmap, where each bit in the bitmap indicates the position of a respective data block. A data block is a pre-determined number of bits from the requested read data 902. For example, the requested read 902 data may consist of two blocks of 4 KB. Due to data size reduction processes, however, the data in the packet payload 908 may be less than two blocks of 4 KB. The data in the packet payload 908 may even be zero bits, that is, empty or null. The packet header 906 may indicate 904 which data blocks are of the pre-determined data pattern by including, for example, a bitmap.

At step 930, the requested read data 902 is reconstructed. To reconstruct the requested read data 902, data blocks that are of the pre-determined data pattern may be generated. The indicator 904 in the packet header 906 informs the process 900 which data blocks to generate, and also indicates the placement of the generated data blocks within the requested read data 902. In some implementations, some of the data blocks for the requested read data 902 are not of the pre-determined data pattern. In these implementations, data blocks that are not of the pre-determined data pattern are extracted from the packet payload 908. The indicator 904 in the packet header 906 informs the process 900 which data blocks to extract, and also indicates the placement of the extracted data blocks within the requested read data 902.

At step 932, the process 900 responds to the read request received at step 920 reconstructed read data is with the read data reconstructed in step 930.

VI. Computer Systems

Figure 17:
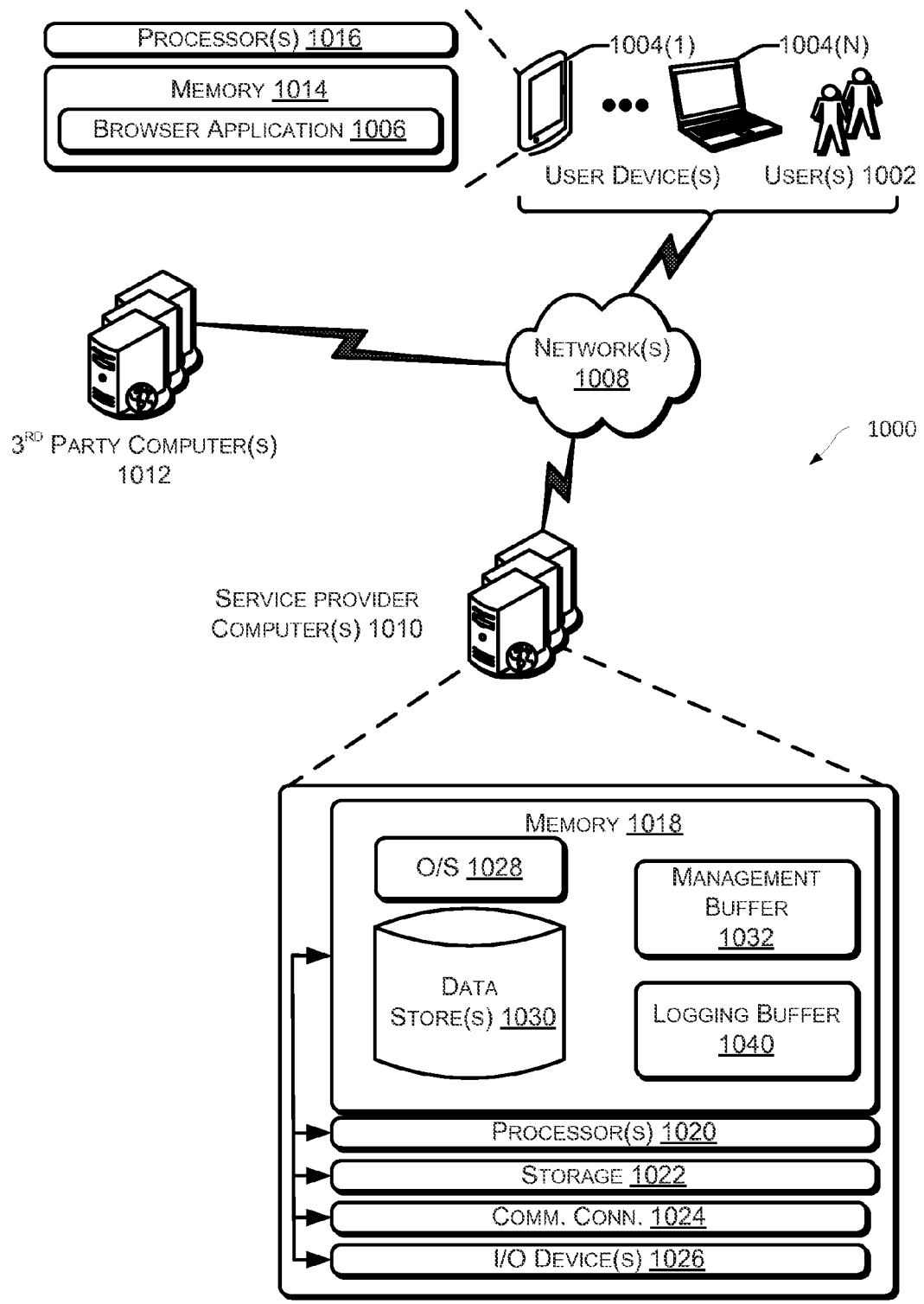
FIG. 17 illustrates an exemplary architecture for features and systems described herein that includes one or more service provider computers and/or a user device connected via one or more networks, according to at least one exemplary embodiment.

FIG. 17 illustrates an exemplary architecture for features and systems described herein that includes one or more service provider computers and/or a user device connected via one or more networks, according to at least one exemplary embodiment. The devices discussed in FIGS. 1-14, may use one or more components of the computing devices described in FIG. 17 or may represent one or more computing devices described in FIG. 17. In the illustrated architecture 1000, one or more users 1002 may use user computing devices 1004(1)-(N) to access an application 1006 (e.g., a web browser or mobile device application), via one or more networks 1008. In some aspects, the application 1006 may be hosted, managed and/or provided by a computing resources service or service provider. One or more service provider computers 1010 may provide a native application which is configured to run on the user devices 1004 which user(s) 1002 may interact with. The service provider computer(s) 1010 may, in some examples, provide computing resources such as, but not limited to, client entities, low latency data storage, durable data storage, data access, management, virtualization, cloud-based software solutions, electronic content performance management, etc. The service provider computer(s) 1010 may also be operable to provide web hosting, computer application development and/or implementation platforms, combinations of the foregoing or the like to the user(s) 1002. The service provider computer(s) 1010, in some examples, may communicate with one or more third party computers 1012.

In some examples, network(s) 1008 may include any one or a combination of many different types of networks, such as cable networks, the Internet, wireless networks, cellular networks and other private and/or public networks. While the illustrated example represents the user(s) 1002 accessing an application 1006 over the network(s) 1008, the described techniques may equally apply in instances where the user(s) 1002 interact with the service provider computer(s) 1010 via user device(s) 1004 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, the application 1006 may allow the user(s) 1002 to interact with the service provider computer(s) 1010 such as to access web content (e.g., web pages, music, video, etc.). The service provider computer(s) 1010, which may be arranged in a cluster of servers or as a server farm, may host the application 1006 and/or cloud-based software services. Other server architectures may also be used to host the application 1006. The application 1006 may be capable of handling requests from many users 1002 and serving, in response, various item web pages. The application 1006 can provide any type of website that supports user interaction, including social networking sites, online retailers, informational sites, blog sites, search engine sites, news and entertainment sites and so forth. As discussed above, the described techniques can similarly be implemented outside of the application 1006, such as with other applications running on the user device(s) 1004.

The user device(s) 1004 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 1004 may be in communication with the service provider computer(s) 1010 via the network(s) 1008, or via other network connections. Additionally, the user device(s) 1004 may be part of the distributed system managed by, controlled by or otherwise part of the service provider computer(s) 1010 (e.g., a console device integrated with the service provider computers 1010).

In one illustrative configuration, a user device(s) 1004 may include at least one memory 1014 and one or more processing units (or processor(s) 1016). The processor(s) 1016 may be implemented as appropriate in hardware, computer-executable instructions, firmware, or combinations thereof. Computer-executable instruction or firmware implementations of the processor(s) 1016 may include computer-executable or machine-executable instructions written in any suitable programming language to perform the various functions described. The user device(s) 1004 may also include geo-location devices (e.g., a global positioning system (GPS) device or the like) for providing and/or recording geographic location information associated with the user device(s) 1004.

The memory 1014 may store program instructions that are loadable and executable on the processor(s) 1016, as well as data generated during the execution of these programs. Depending on the configuration and type of the user device(s) 1004, the memory 1014 may be volatile (such as random access memory (RAM)) and/or non-volatile (such as read-only memory (ROM), flash memory, etc.). The user device(s) 1004 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 1014 may include multiple different types of memory, such as static random access memory (SRAM), dynamic random access memory (DRAM), or ROM.

Turning to the contents of the memory 1014 in more detail, the memory 1014 may include an operating system and one or more application programs or services for implementing the features disclosed herein including at least a user provided input element or electronic service web page, such as via a browser application 1006 or dedicated applications (e.g., smart phone applications, tablet applications, etc.). The browser application 1006 may be configured to receive, store and/or display a website or other interface for interacting with the service provider computer(s) 1010. Additionally, the memory 1014 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1004.

In some aspects, the service provider computer(s) 1010 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1010 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 1010 may be in communication with the user device(s) 1004 and/or other service providers via the network(s) 1008, or via other network connections. The service provider computer(s) 1010 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the service provider computer(s) 1010 may include at least one memory 1018 and one or more processing units (or processor(s) 1020). The processor(s) 1020 may be implemented as appropriate in hardware, computer-executable instructions, firmware or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the service provider computer(s) 1010, the memory 1018 may be volatile (such as RAM) and/or non-volatile (such as ROM, flash memory, etc.). The service provider computer(s) 1010 or servers may also include additional storage 1022, which may include removable storage and/or non-removable storage. The additional storage 1022 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 1018 may include multiple different types of memory, such as SRAM, DRAM, or ROM.

The memory 1018, the additional storage 1022, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. The memory 1018 and the additional storage 1022 are all examples of computer storage media. Additional types of computer storage media that may be present in the service provider computer(s) 1010 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1010. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 1010 may also contain communications connection(s) 1024 that allow the service provider computer(s) 1010 to communicate with a stored database, another computing device or server, user terminals and/or other devices on the network(s) 1008. The service provider computer(s) 1010 may also include I/O device(s) 1026, such as a keyboard, a mouse, a pen, a voice input device, a touch input device, a display, speakers, a printer and the like.

The memory 1018 may include an operating system 1028, one or more data stores 1030 and/or one or more application programs or services for implementing the features disclosed herein, including a management buffer 1032 and a logging buffer 1040. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 17, and/or functions described herein can be provided by one or more modules that exist as separate modules and/or module functions described herein can be spread over multiple modules.

Figure 18:
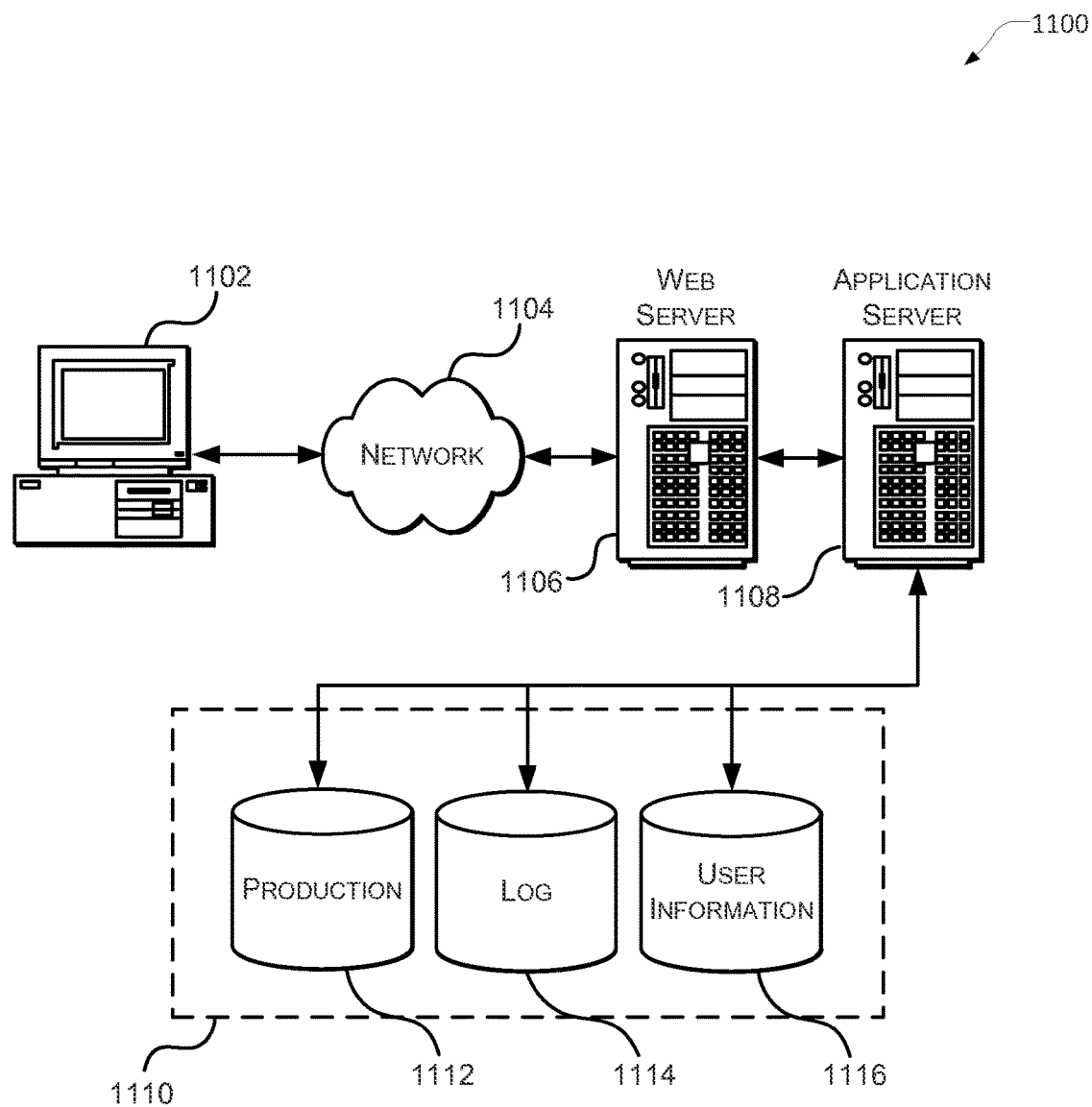
FIG. 18 illustrates aspects of an example environment for implementing aspects in accordance with various embodiments.

FIG. 18 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1100 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An Input/Output (I/O) adapter device comprising:
a memory;
a first integrated circuit including a pipeline, wherein the pipeline includes a plurality of stages, wherein the plurality of stages are processed in sequential order for a single request, and wherein the plurality of stages are configured to operate simultaneously with each stage processing different requests; and
a second integrated circuit including one or more processing cores, wherein each processing core is configured to execute a respective plurality of computer-executable instructions, wherein the plurality of computer-executable instructions, when executed by the one or more processing cores, cause the one or more processing cores to execute operations including:
receiving a request to write data to a storage location on a network, wherein the request is received from a host device coupled to the I/O adapter device;
reading data associated with the request, wherein the data is read from the host device; and
placing a write packet associated with the request in the pipeline;
wherein the pipeline is configured to:
divide, using a first stage from the plurality of stages, the data into a plurality of data blocks of equal size, wherein the first stage is configured to write the plurality of data blocks into a buffer in the memory;
identify, using a second stage from the plurality of stages, a first set of data blocks from the plurality of data blocks, wherein each data block from the first set of data blocks match a pre-determined data pattern;
assemble, using a third stage from the plurality of stages, a payload for the write packet, wherein the payload includes a second set of data blocks from the plurality of data blocks, wherein the second set of data blocks excludes the first set of data blocks, and wherein the third stage is configured to read the second set of data blocks from the buffer in the memory;
write, using a fourth stage from the plurality of stages, a set of indicators into a header of the write packet, wherein the set of indicators include an indicator for each of the plurality of data blocks, wherein an indicator associated with the first set of data blocks is set to a first value to indicate that the first set of data blocks have been excluded from the payload, and wherein an indicator associated with the second set of data blocks is set to a second value to indicate that the second set of data blocks have been included in the payload; and
transmit the write packet onto the network, wherein the write packet is addressed to the storage location.

2. The I/O adapter device of claim 1, wherein the pipeline is further configured to:
write the size of the plurality of data blocks into the header.

3. The I/O adapter device of claim 1, wherein the size of the plurality of data blocks corresponds to a size of a logical block of the storage location.

4. The I/O adapter device of claim 1, wherein an order of the set of indicators corresponds to an order of the plurality of data blocks.

5. The I/O adapter device of claim 1, wherein the request includes the size for the plurality of data blocks.

6. The I/O adapter device of claim 1, further comprising a System-on-a Chip (SoC), wherein the SoC includes the first integrated circuit and the second integrated circuit.

7. An Input/Output (I/O) adapter device comprising:
a memory;
a first integrated circuit including a pipeline, wherein the pipeline includes a plurality of stages, wherein the plurality of stages are processed in sequential order for a single request, and wherein the plurality of stages are configured to operate simultaneously with each stage processing different requests;

a second integrated circuit including one or more processing cores, wherein each processing core is configured to execute a respective plurality of computer-executable instructions, wherein the plurality of computer-executable instructions, when executed by the one or more processing cores, cause the one or more processing cores to execute operations including:

receiving a request to read data from a storage location on a network, wherein the request is received from a host device coupled to the I/O adapter device;

placing a read packet associated with the request in the pipeline;

wherein the pipeline is configured to:

transmit, using a first stage from the plurality of stages, the read packet onto the network, wherein the read packet is addressed to the storage location;

receive, at a second stage from the plurality of stages, a response packet, wherein the response packet includes a set of indicators in a header of the response packet, and wherein a payload of the response packet includes response data;

divide, using a third stage from the plurality of stages, the response data into a set of data blocks of equal size, wherein the third stage is configured to write the set of data blocks into a buffer in the memory;

read, using a fourth stage from the plurality of stages, the set of indicators from the header of the response packet, wherein the set of indicators include an indicator for each of a plurality of data blocks corresponding to the requested read data;

assemble, using a fifth stage from the plurality of stages, the plurality of data blocks, wherein the fifth stage is configured to, based on an indicator from the set of indicators, read a corresponding data block from the buffer in the memory or generate a corresponding a data block, wherein the generated data block is generated according a pre-determined data pattern; and wherein the one or more processing cores are configured to:

write the plurality of data blocks to the host device.

8. The I/O adapter device of claim 7, wherein the header includes the size of the plurality of data blocks.

9. The I/O adapter device of claim 8, wherein the fifth stage is configured to use the size to generate the generated data block.

10. The I/O adapter device of claim 7, wherein the request includes the size for the plurality of data blocks.

11. The I/O adapter device of claim 7, wherein an order of the set of indicators corresponds to an order of the plurality of data blocks.

12. The I/O adapter device of claim 7, wherein the size of the plurality of data blocks corresponds to a size of a logical block of the storage location.

13. The I/O adapter device of claim 7, further comprising a System-on-a-Chip, where the SoC includes the first integrated circuit and the second integrated circuit.

14. A computer-implemented method, comprising:

receiving, at a first integrated circuit device of an Input/Output (I/O) adapter device, a request to write data to a storage location on a network, wherein the request is received from a host device coupled to the I/O adapter device, wherein the first integrated circuit device includes one or more processing cores, wherein each processing core is configured to execute a respective plurality of computer-executable instructions, wherein the I/O adapter device includes a second integrated circuit device, wherein the second integrated circuit device includes a pipeline including a plurality of stages, wherein the plurality of stages are processed in sequential order for a single request, and wherein the plurality of stages are configured to operate simultaneously with each stage processing different requests;

reading, by the first integrated circuit device, data associated with the request, wherein the data is read from the host device;

placing, by the first integrated circuit device, a write packet associated with the request in the pipeline;

dividing, by the second integrated circuit device, the data into a plurality of data blocks of equal size, wherein the data is divided using a first stage from the plurality of stages, and wherein the first stage is configured to write the plurality of data blocks into a buffer in a memory of the I/O adapter device;

identify, by the second integrated circuit device, a first set of data blocks from the plurality of data blocks, wherein the first set of data blocks is identified using a second stage from the plurality of stages, and wherein each data block from the first set of data blocks matches a pre-determined pattern;

assembling, by the second integrated circuit device, a payload for the write packet, wherein the payload is assembled using a third stage from the plurality of stages, wherein the payload includes a second set of data blocks from the data blocks, wherein the second set of data blocks excludes the first set of data blocks, and wherein the third stage is configured to read the second set of data blocks from the buffer in the memory;

writing, by the second integrated circuit device, a set of indicators into a header of the write packet, wherein the set of indicators is written using a fourth stage from the plurality of stages, wherein the set of indicators include an indicator associated with each of the data blocks, wherein an indicator associated with the first set of data blocks is set to a first value to indicate that the first set of data blocks have been excluded from the payload, and wherein an indicator associated with the second set of data blocks is set to a second value to indicate that the second set of data blocks have been included in the payload; and transmitting, by the second integrated circuit device, the write packet onto the network, wherein the write packet is addressed to the storage location.

15. The computer-implemented method of claim 14, further comprising:

writing, using the second integrated circuit device, the size of the plurality of data blocks into the header.

16. The computer-implemented method of claim 14, wherein the size of the plurality of data blocks corresponds to a size of a logical block of the storage location.

17. The computer-implemented method of claim 14, wherein the request includes the size for the plurality of data blocks.

18. A computer-implemented method, comprising:

receiving, at a first integrated circuit device of an Input/Output (I/O) adapter device, a request to read data from a storage location on a network, wherein the request is received from a host device coupled to the I/O adapter device, wherein the first integrated circuit device includes one or more processing cores, wherein each processing core is configured to execute a plurality of computer-executable instructions, wherein the I/O adapter device includes a second integrated circuit device, wherein the second integrated circuit device includes a pipeline including a plurality of stages, wherein the plurality of stages are processed in sequential order for a single request, and wherein the plurality of stages are configured to operate simultaneously with each stage processing different requests;

placing, by the first integrated circuit device, a read packet associated with the request in the pipeline;

transmitting, by the second integrated circuit device, the read packet, wherein the read packet is transmitted using a first stage from the plurality of stages, and wherein the read packet is addressed to the storage location;

receiving, by the second integrated circuit device, a response packet, wherein the response packet is received using a second stage from the plurality of stages, wherein the response packet includes a set of indicators in a header of the response packet, and wherein a payload of the response packet includes response data;

dividing, by the second integrated circuit device, the response data into a set of data blocks of equal size, wherein the response data is divided using a third stage from the plurality of stages, and wherein the third stage is configured to write the set of data blocks into a buffer in a memory of the I/O adapter device;

reading, by the second integrated circuit device, the set of indicators from the header of the response packet, wherein the set of indicators is read using a fourth stage from the plurality of stages, wherein the set of indicators include an indicator for each of a plurality of data blocks corresponding to the requested read data;

assembling, by the second integrated circuit device, the plurality of data blocks, wherein the read data is assembling using a fifth stage from the plurality of stages, wherein the fifth stage is configured to, based on an indicator from the set of indicators, read a corresponding data block from the buffer in the memory or generate a corresponding data block, wherein the generated data block is generated according to a predetermined pattern; and writing, by the first integrated circuit device, the plurality of data blocks to the host device.

19. The computer-implemented method of claim 18, wherein the header includes the size of the plurality of data blocks.

20. The computer-implemented method of claim 19, wherein the fifth stage is configure to use the size to generate the generated data block.

21. The computer-implemented method of claim 18, wherein the request includes the size for the plurality of data blocks.

22. The computer-implemented method of claim 18, wherein the size of the plurality of data blocks corresponds to a size of a logical block of the storage location.

* * * * *